United States Patent
Ikegami et al.

(10) Patent No.: US 6,624,602 B2
(45) Date of Patent: Sep. 23, 2003

(54) MOTOR DRIVING APPARATUS

(75) Inventors: Akihiko Ikegami, Suwa (JP); Shinichi Miyazaki, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/898,502

(22) Filed: Jul. 3, 2001

(65) Prior Publication Data

US 2002/0033682 A1 Mar. 21, 2002

(30) Foreign Application Priority Data

Jul. 7, 2000 (JP) .................................. 2000-207080

(51) Int. Cl.[7] .............................................. H02K 23/00
(52) U.S. Cl. ...................................... 318/254; 318/138
(58) Field of Search .................................. 318/138, 254, 318/439, 696, 685, 599, 561, 638; 700/69, 78; 358/1.5

(56) References Cited

U.S. PATENT DOCUMENTS

| | | | | |
|---|---|---|---|---|
| 4,477,757 A | * | 10/1984 | Palombo et al. ............ 318/696 |
| 4,490,796 A | * | 12/1984 | Bigbie et al. ............... 318/561 |
| 4,757,241 A | * | 7/1988 | Young ......................... 318/254 |
| 5,872,435 A | * | 2/1999 | Bolte et al. ................. 318/254 |

* cited by examiner

*Primary Examiner*—Khanh Dang
(74) *Attorney, Agent, or Firm*—Harness, Dickey & Pierce, P.L.C.

(57) ABSTRACT

A pulse signal is output from a position detector or the like provided on an object to be driven by the motor as the object to be driven travels, and the commutation of the motor is controlled on the basis of the pulse signal. More specifically, the object to be driven is driven by the motor, so that the travel of the object to be driven is proportional to the rotational amount of the motor, and the rotational state of the motor can be detected from the traveling state of the object to be driven, thus enabling the detection of the position of the rotor. Hence, by controlling the commutation of the motor on the basis of a detection signal from the position detector, a commutation timing can be precisely detected even if the motor is in a low speed zone.

18 Claims, 8 Drawing Sheets

[FIG. 1]
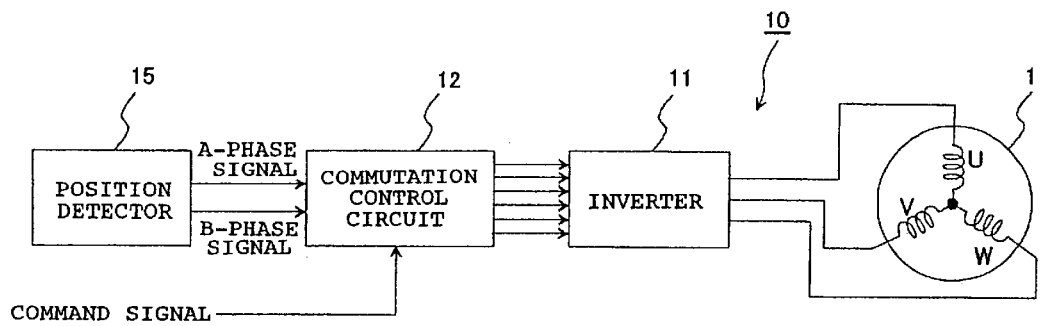
[FIG. 2]
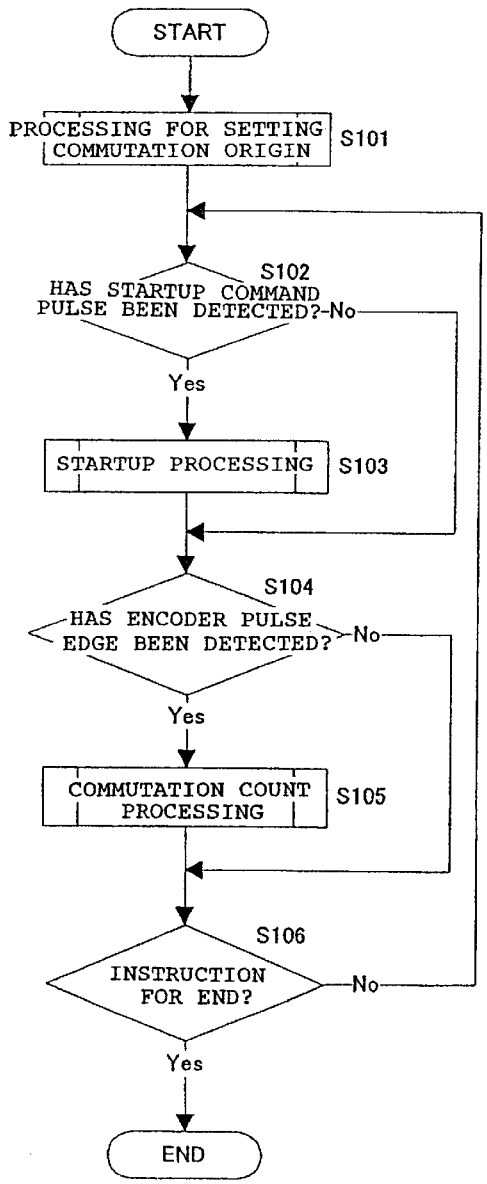

[FIG. 3]
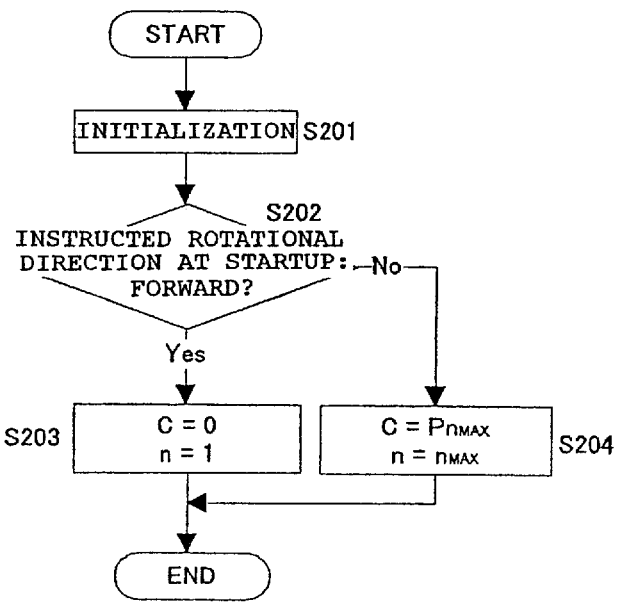
[FIG. 4]
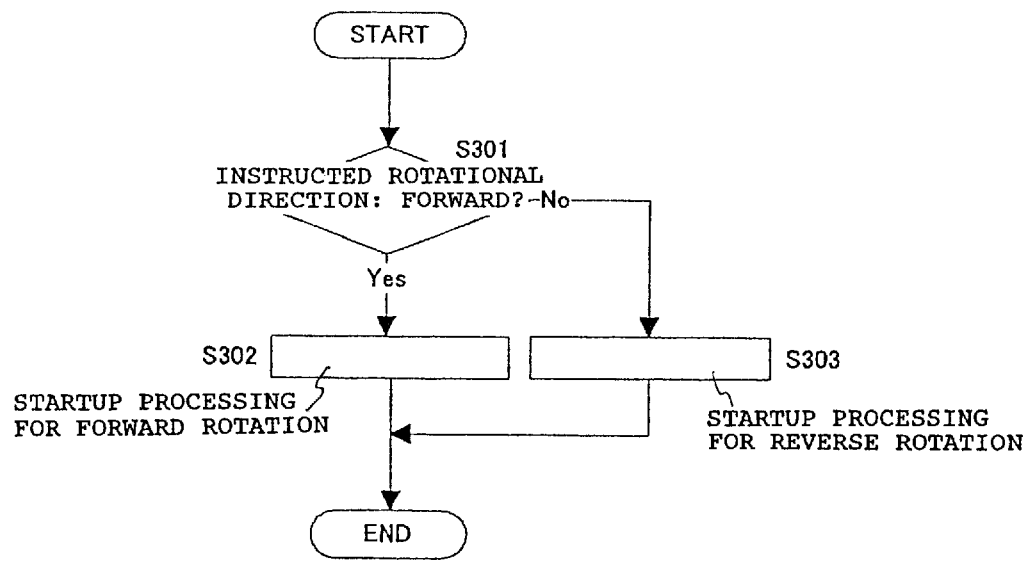

[FIG. 5]
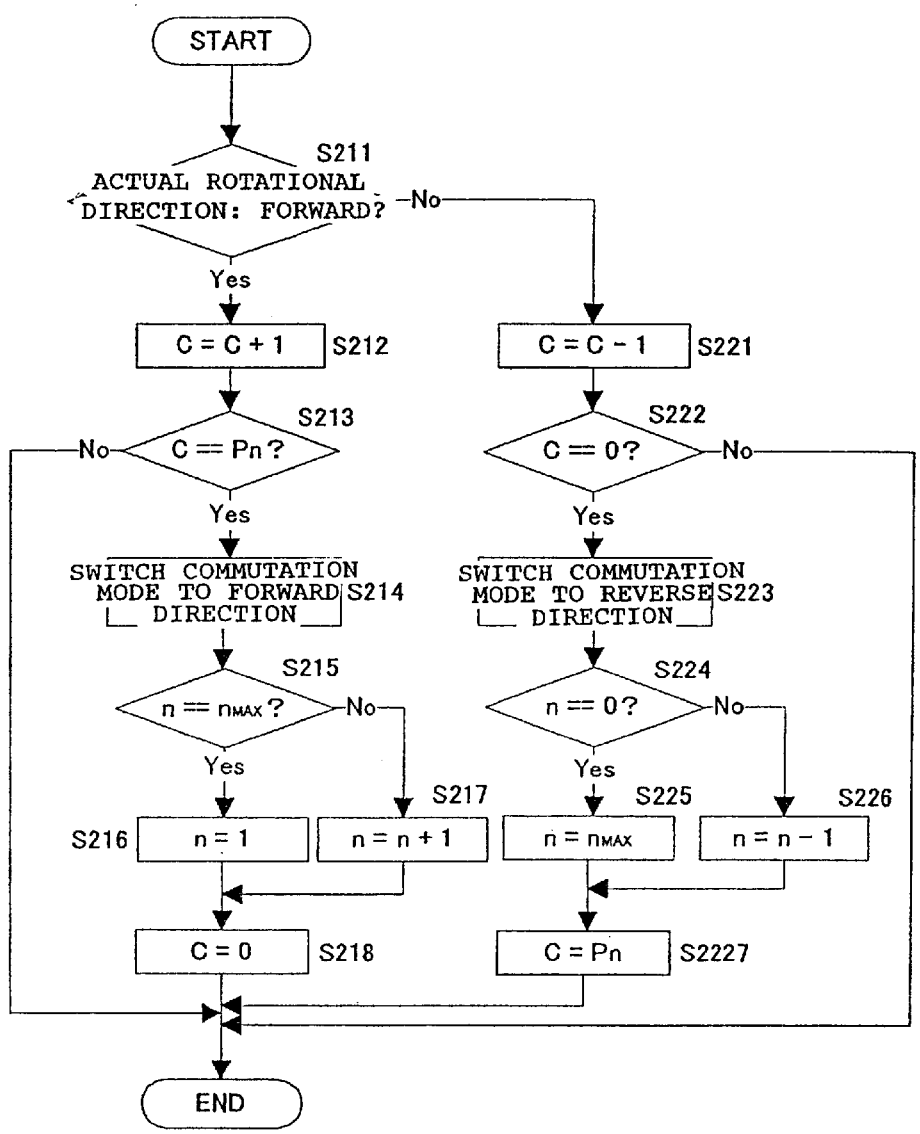

[FIG. 6]
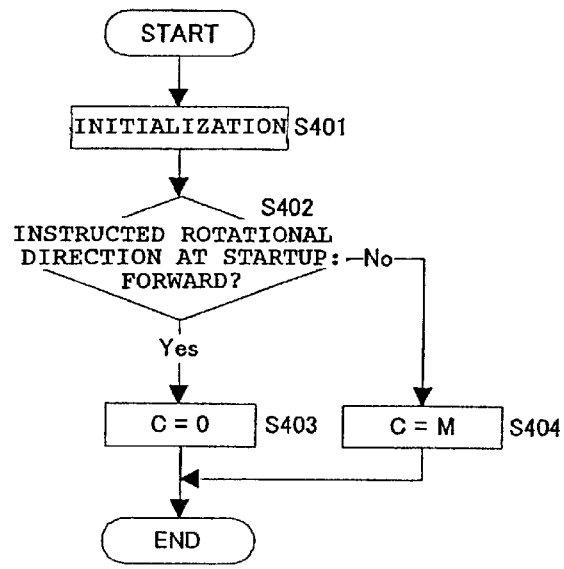
[FIG. 7]
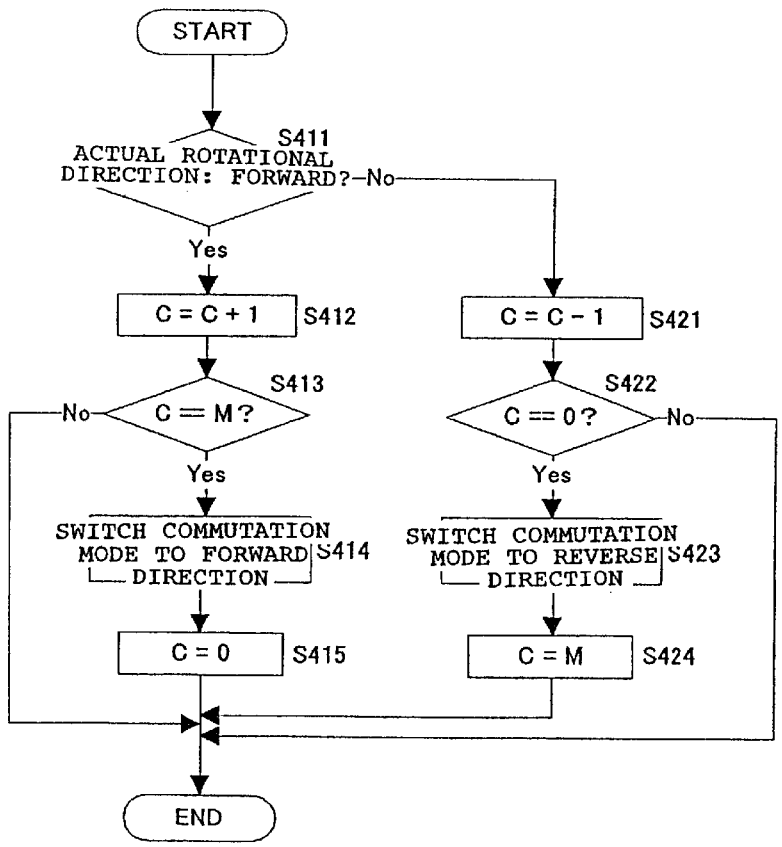

[FIG. 8]
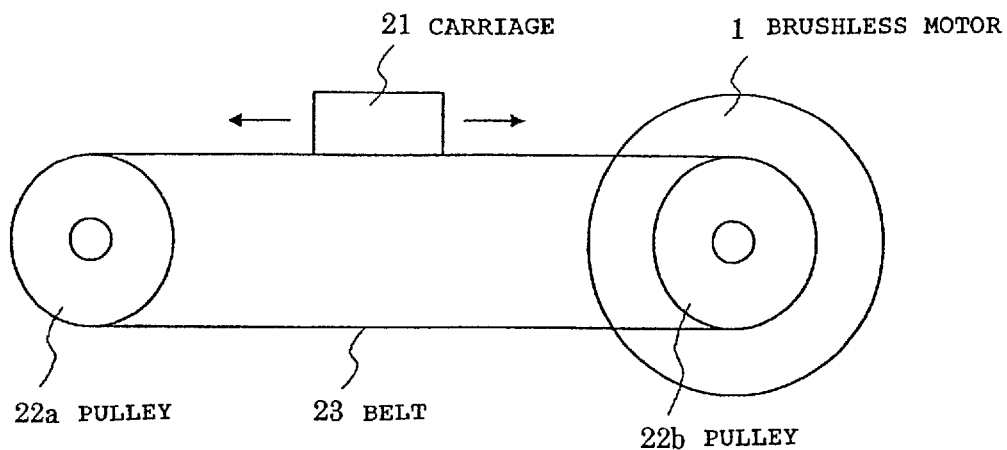
[FIG. 9]
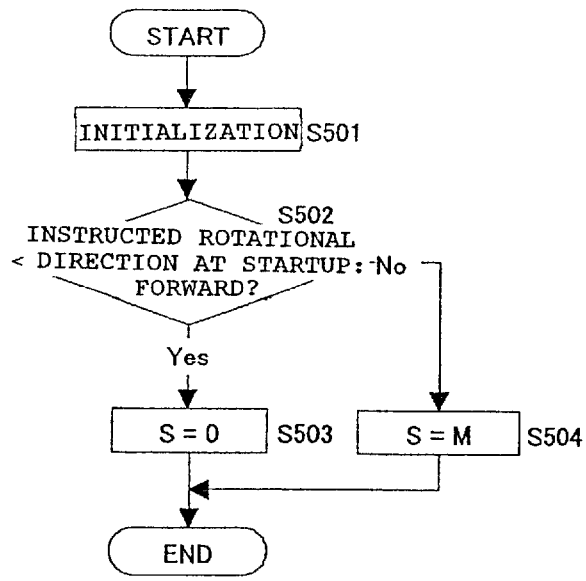

[FIG. 10]
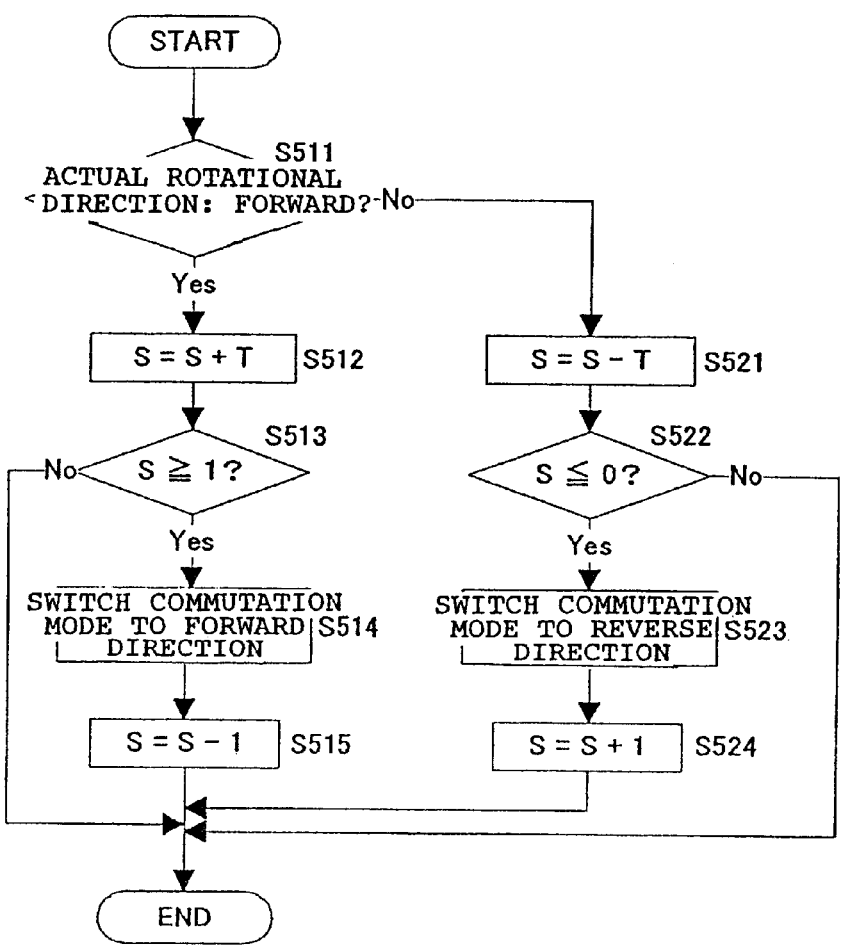

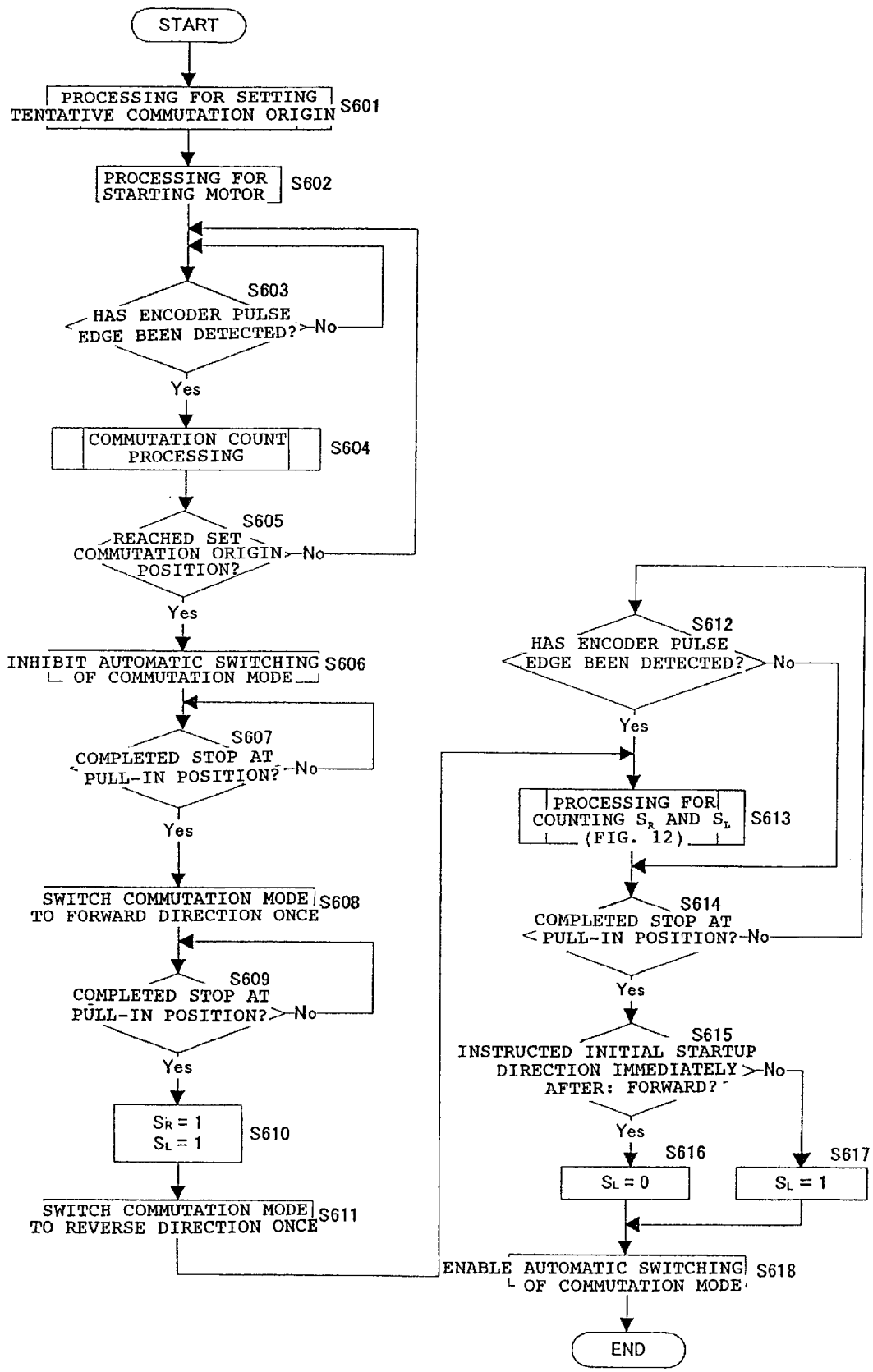
[FIG. 11]

[FIG. 12]
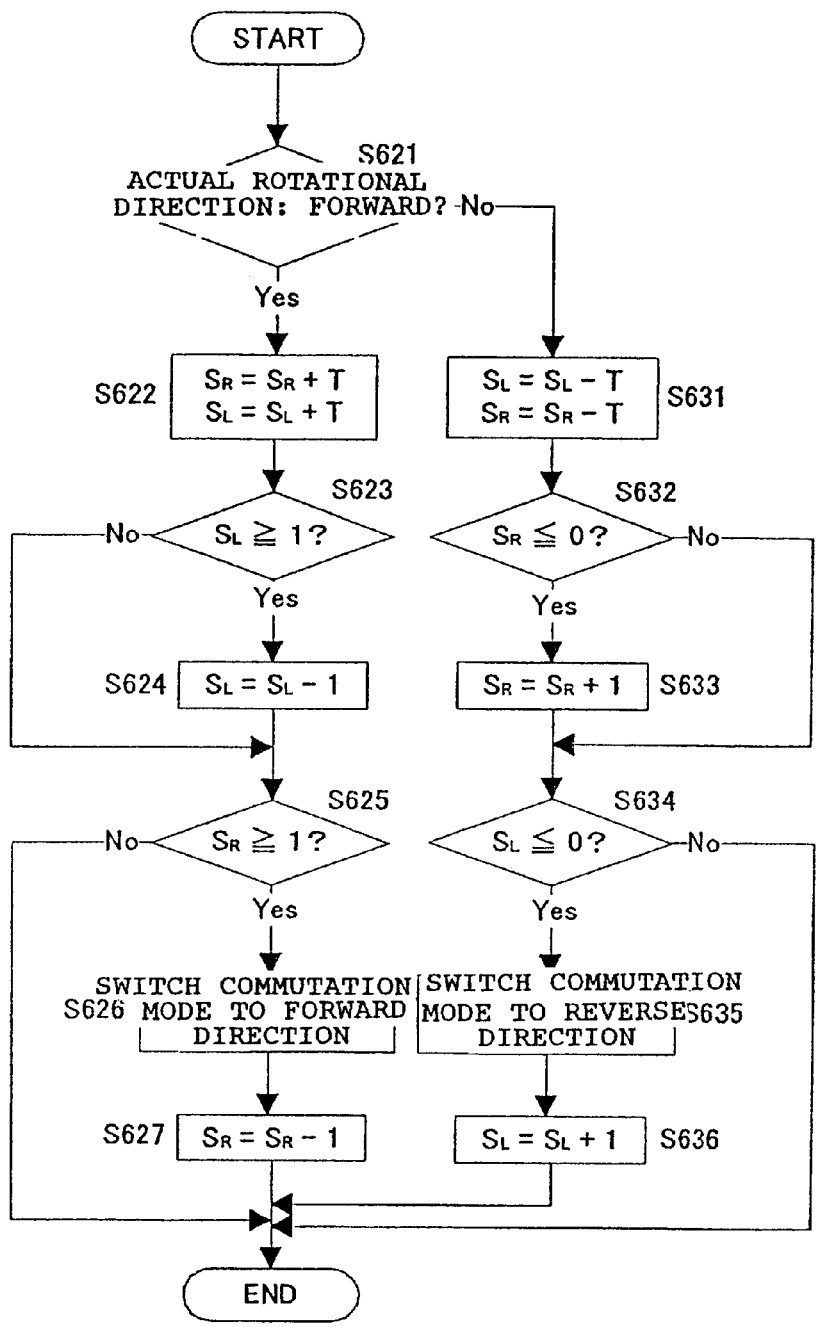

MOTOR DRIVING APPARATUS

TECHNICAL FIELD OF THE INVENTION

The present invention relates to a motor driving apparatus adapted to switch an exciting phase according to the position of a rotor to carry out commutation control thereby to perform rotational drive as in a brushless DC motor or a step motor or the like, and more specifically, it relates to a motor driving apparatus adapted to control the commutation of a motor by making use of a position detector for detecting the position of an object driven by the motor.

DESCRIPTION OF THE RELATED ART

As an art for detecting the rotational position of a motor employing a permanent magnet for a rotor as in a brushless DC motor or a step motor or the like, there has conventionally been one that utilizes a counter-electromotive voltage generated in an open phase (unenergized phase) of a stator winding. More specifically, a counter-electromotive voltage obtained from an exciting coil is detected, and the zero-cross point at which the detected counter-electromotive voltage crosses a neutral point voltage is determined so as to detect the position of the rotor. The commutation control in this case is implemented by performing a commutation operation at a point where the phase has been shifted by, for example, 30 degrees from the foregoing zero-cross point.

Therefore, when the motor is at rest, no counter-electromotive voltage can be obtained from the exciting coil, and no sensorless drive can be performed. Hence, to start the motor at rest to rotationally drive it, so-called forced commutation is carried out to forcibly drive the rotor thereby to obtain a counter-electromotive voltage of a predetermined value or more from the exciting coil before proceeding to the sensorless drive.

In contrast to such sensorless control of a motor, there has also been known a method or the like wherein a motor is provided with a Hall element to thereby detect the position of a rotor to drive the motor on the basis thereof.

SUMMARY OF THE INVENTION

However, when conducting the sensorless control based on counter-electromotive voltage, the control cannot be conducted at low speed as described above, making it unsuited for carrying out drive control that involves repetitious stops and starts. According to the method whereby the control is conducted using a Hall element or the like, the control can be conducted even at low speed; however, the variations in the magnetic pole dividing width of the magnetic pole of a rotor, the variations in the position where the Hall element is installed, etc. directly affect control accuracy in the form of commutation timing errors. Hence, in an operation in a speed range wherein counter-electromotive voltages can be detected, the sensorless control based on counter-electromotive voltages is currently stable since it does not involve the errors mentioned above. There has been a demand for a driving method that allows control to be carried out even at low speed and also permits control of a motor with higher accuracy to be achieved.

Accordingly, the present invention has been made with attention focused on the above-mentioned conventional unsolved problems, and it is an object of the present invention to provide a motor driving apparatus capable of reliably carrying out control even at low speed and of controlling the drive of a motor with higher accuracy.

To attain the above object, a motor driving apparatus of the present invention is characterized by the provision of a position detector that outputs a pulse signal as an object driven by a motor travels, and commutation controlling means for controlling the commutation of the motor on the basis of the pulse signal from the position detector.

A pulse signal is output from a position detector or the like provided on an object to be driven by the motor as the object to be driven travels, and the commutation of the motor is controlled on the basis of the pulse signal. More specifically, the object to be driven is driven by the motor, so that the travel of the object to be driven is proportional to the rotational amount of the motor, and the rotational state of the motor can be detected from the traveling state of the object to be driven, thus enabling the detection of the position of the rotor. Hence, by controlling the commutation of the motor on the basis of a detection signal from the position detector, a commutation timing can be precisely detected even if the motor is in a low speed zone.

A motor driving apparatus can also be characterized by the provision of a position detector that outputs a pulse signal as an object driven by a motor travels, and is able to output at least one or more pulses per commutation section of the motor, counting means for adding or subtracting pulses from the position detector according to a rotational direction of the motor, taking a state wherein a rotor of the motor is in an initial position as a reference, commutation pattern storing means for storing a commutation pattern that specifies a commutation timing set on the basis of the number of pulses per commutation section of the motor, and commutation controlling means for performing the commutation of the motor if a count value of the counting means coincides with a commutation pattern stored by the commutation pattern storing means.

When the motor runs, thereby causing an object to be driven to travel, for example, a pulse of a pulse signal from a position detector provided on the object to be driven is counted according to the rotational direction of the motor, and the commutation of the motor is performed when a count value, which uses a reference when the rotor of the motor is at a position based on a commutation timing, coincides with a commutation pattern stored by the commutation pattern storing means. The commutation pattern is set on the basis of the number of pulse signals received per commutation section that has been detected in advance; therefore, commutation will be performed at an exact commutation timing by carrying out commutation at a point where the count value agrees with the commutation pattern.

The motor driving apparatus can further be characterized in that the commutation pattern is constructed by a string of commutation timing values set on the basis of a string of numeric values created by adding the number of section pulses, which is the number of pulses per commutation section, until a sum of the number of section pulses becomes an integral value, rounding off all digits to the right of a decimal point of the sum of the number of section pulses in each adding cycle so as to obtain an integral value, and arranging the integral values in an ascending order, and the commutation controlling means repeatedly switches the commutation timing values in the order in which the commutation timing values are arranged in the commutation pattern, and performs commutation each time the commutation timing value coincides with the count value.

The commutation pattern is constructed by a string of numeric values based on the number of additions performed until the sum of the number of section pulses, which indicates the number of pulses per commutation section, reaches an integral value when the numbers of section pulses are added in sequence. Since the number of section pulses is the number of pulse signal per commutation section, commutation may be performed each time the count value coincides with the number of section pulses. If, however, the number of section pulses is not an integral value, then the commutation timing based on the number of section pulses will be deviated from an actual commutation timing based on a count value.

If an integral value is obtained when the number of section pulses is added several times, then the commutation timing determined on the basis of the number of section pulses agrees with a true commutation timing based on the position of a rotor at the point when the integral value is reached; therefore, no difference in the commutation timing will result at that point. Hence, the number of times of additions performed until an integral value is reached when the numbers of section pulses are added is defined as one cycle, the digits to the right of the decimal point of the sum of the numbers of section pulses at respective commutation timings based on the numbers of section pulses in the one cycle are rounded off to represent it in the form of an integral value, and a string of numeric values constructed by, for example, arranging the integral values, which have been approximated by rounding off, in an ascending order as commutation timing values, or a string of numeric values constructed by the differences among the approximated values in an ascending order of the number of additions as the commutation timing values is set as a commutation pattern. And, by changing the commutation timing values in sequence according to the arranging order in the commutation pattern and by carrying out commutation each time a commutation timing value agrees with a count value, the difference between a commutation timing based on the number of section pulses and a commutation timing based on a count value will be brought to zero at a point when one cycle of commutation is implemented, that is, at a point when a series of commutations is implemented on the basis of the commutation timing values making up the commutation pattern. Thus, no error will be accumulated each time commutation is performed.

The motor driving apparatus of the present invention is characterized by the provision of a position detector that outputs a pulse signal as an object driven by a motor travels, and is able to output at least one or more pulses per commutation section of the motor, commutation constant storing means for storing, as a commutation constant, a reciprocal of the number of section pulses, which is the number of pulses from the position detector per commutation section of the motor, that has been detected in advance, and commutation controlling means that adds or subtracts a commutation constant, which is stored by the commutation constant storing means, according to a rotational direction of the motor each time a pulse is received from the position detector, taking a state wherein a rotor of the motor is in an initial position as a reference, and performs commutation of the motor if a cumulative value of the commutation constant becomes an integral value or if an integral portion of the cumulative value changes, or if a sign of the cumulative value changes.

The motor driving apparatus can also be characterized in that the commutation constant is a value obtained by dividing the number of commutations required for rotating the rotor by a predetermined amount by a design value of the number of pulses to be received for rotating the rotor by the predetermined amount.

The motor driving apparatus can further be characterized in that the commutation constant is a value obtained by dividing the number of commutations required for rotating the rotor by a predetermined amount by a measured value of the number of pulses that have been received when the rotor has been rotated by the predetermined amount.

The motor driving apparatus can also be characterized in that the commutation constant is a value obtained by dividing the number of commutations required for rotating the rotor once by a measured value of the number of pulses that have been received when the rotor has been rotated once.

The motor driving apparatus can further be characterized in that if the commutation constant is denoted as T, a significant digit to the right of the decimal point thereof is denoted as n, the travel amount of the object to be driven is denoted as L, the resolution of the position detector (the travel amount of the object to be driven/the number of pulses) is denoted as B, a permissible value of the difference between an estimated position of the rotor estimated on the basis of the pulse signal and the actual position of the rotor is denoted in terms of an electrical angle σ, and the electrical angle of one commutation is denoted as F, then a relationship of $(T+(L/B)\times(5/10^{n+1}))\times F<\sigma$ holds.

The motor driving apparatus can also be characterized in that the object to be driven is an ink discharging head of an ink-jet printer, and the significant digit number to the right of the decimal point of the commutation constant is 4 to 8 digits.

When the motor runs to cause an object to be driven to travel, a pulse signal is output from the position detector due to the travel, and a commutation constant is added or subtracted according to the rotational direction of the motor each time a pulse is received, using a reference obtained when the rotor of the motor is in an initial position based on a commutation timing position. For example, the commutation constant is added in the case of a forward rotation, or subtracted in the case of a reverse rotation.

In this case, the commutation constant is the reciprocal of the number of pulses from the position detector per commutation section of the motor, so that it is a value to the right of a decimal point. Hence, at a point when the integral portion of an accumulated value of the commutation constant changes, or when the accumulated value reaches an integral value that includes a zero, or when the sign of the accumulated value changes, that is, when switching from a positive value to a negative value takes place or vice versa, this will be a commutation timing. Performing commutation at that commutation timing will allow commutation to be conducted at an exact timing.

The commutation constant can be easily calculated by dividing the number of commutations required for rotating the rotor by a predetermined amount by a design value of the number of pulses to be received when the rotor is rotated by the predetermined amount. Furthermore, by measuring the number of pulses actually received when the rotor is rotated by a predetermined amount and by calculating a commutation constant on the basis of the measured number of pulses, it is possible to set a commutation constant appropriate to the actual transfer characteristics of a transfer system of the driving force of the motor. In particular, by measuring the number of pulses received when the rotor is rotated once and by calculating the commutation constant on the basis of the calculated number of pulses, it is possible to obtain a commutation constant in which all variations at commutation timings attributable to dimensional errors or the like of the components in the motor are evened, permitting the prevention of commutation timing errors from being accumulated.

Furthermore, if the significant digit number to the right of the decimal point of the commutation constant T is denoted as n, the travel amount of the object to be driven is denoted as L, the resolution of the position detector (the travel amount of the object to be driven/the number of pulses) is denoted as B, a permissible value of the difference between an estimated position of the rotor estimated on the basis of the pulse signal and the actual position of the rotor is denoted in terms of an electrical angle σ, and the electrical angle during one commutation is denoted as F, then the commutation constant T is set to satisfy $(T+(L/B)\times(5/10^{n+1}))\times F<\sigma$. Hence, even if the travel of the object to be driven or the variables, such as a resolution, of the position detector change, it will be possible to carry out commutation control that allows permissible value σ to be satisfied.

Especially when the object to be driven is an ink discharging head of an ink-jet printer, setting significant digit number n to the right of the decimal point of the commutation constant to 4 to 8 enables the ink discharging head to be applicable to printers handling almost all paper sizes.

The motor driving apparatus can further be characterized in that the commutation controlling means subtracts 1 from the cumulative value each time the cumulative value of the commutation constant reaches 1 or more while the commutation constant is being added, whereas it adds 1 to the cumulative value each time the cumulative value reaches 0 or less while the commutation constant is being subtracted.

The motor driving apparatus can also be characterized in that if the digit number to the right of the decimal point of the commutation constant is denoted as m, the commutation controlling means multiplies the commutation constant by $10^m$ to handle it as an integral value of a digit number m, and performs commutation if an (m+1)th digit on the high order side of a cumulative value of the commutation constant changes or the cumulative value reaches zero, or the sign of the cumulative value changes.

The motor driving apparatus can further be characterized in that the commutation controlling means subtracts $10^m$ from the cumulative value each time the (m+1)th digit on the high order side of the cumulative value of the commutation constant changes, and adds $10^m$ to the cumulative value each time the cumulative value reaches 0 or less.

The commutation controlling means subtracts 1 from the cumulative value each time the cumulative value of the commutation constant reaches 1 or more while the commutation constant is being added, whereas it adds 1 to the cumulative value each time the cumulative value reaches 0 or less while the commutation constant is being subtracted. This makes it possible to avoid an increase in the number of digits of the cumulative value of the commutation constant.

On the other hand, when the digit number to the right of the decimal point of the commutation constant is m, the commutation controlling means multiplies the commutation constant by $10^m$ so as to handle it as an integral value, so that an operation will include only integral values, thus making it possible to simplify the operation.

In this case, it is also possible to avoid an increase in the number of digits of a cumulative value of a commutation constant by subtracting $10^m$ from the cumulative value each time the (m+1)th digit on the high order side of the cumulative value of the commutation constant changes, and conversely, by adding $10^m$ to the cumulative value each time the cumulative value reaches 0 or less.

BRIEF DESCRIPTION OF THE DRAWINGS

FIG. 1 is a block diagram showing a schematic construction of a driving apparatus for a brushless motor to which the present invention is applied.

FIG. 2 is a flowchart illustrating an example of the processing procedure of commutation control processing.

FIG. 3 is a flowchart illustrating a processing procedure for the processing for setting a commutation origin in a first embodiment.

FIG. 4 is a flowchart illustrating an example of the processing procedure of startup processing in the commutation control processing of FIG. 2.

FIG. 5 is a flowchart illustrating an example of the processing procedure of commutation count processing in the first embodiment.

FIG. 6 is a flowchart illustrating an example of the processing procedure of the processing for setting a commutation origin in a second embodiment.

FIG. 7 is a flowchart illustrating an example of the processing procedure of commutation count processing in the second embodiment.

FIG. 8 is a schematic block diagram when a carriage is driven as an object to be driven.

FIG. 9 is a flowchart illustrating an example of the processing procedure of the processing for setting a commutation origin in a third embodiment.

FIG. 10 is a flowchart illustrating an example of the processing procedure of commutation count processing in the third embodiment.

FIG. 11 is a flowchart illustrating an example of the processing procedure of the processing for setting a commutation origin in a fourth embodiment.

FIG. 12 is a flowchart illustrating an example of the processing procedure of commutation count processing in the fourth embodiment.

DETAILED DESCRIPTION OF THE PREFERRED EMBODIMENTS

The embodiments of the present invention will now be described in conjunction with the accompanying drawings.

First, a first embodiment of the present invention will be described.

FIG. 1 is a block diagram showing a driving apparatus 10 of a brushless motor 1 to which the present invention has been applied.

More specifically, the brushless motor 1 is a three-phase brushless motor in which three stator windings of a U-phase, a V-phase, and a W-phase are star-connected. The driving apparatus 10 has an inverter 11, and output terminals of the inverter 11 are connected to the terminals of the U-phase through the W-phase of the brushless motor 1. The inverter 11 has a publicly known configuration provided with, for example, three sets furnished for the U-phase through the W-phase, a transistor connected to a power source and a transistor connected to the ground being coupled to each of the sets. Turning ON/OFF of a total of six transistors included in the inverter is controlled by commutation signals supplied from a commutation control circuit 12 thereby to excite the phases of the brushless motor 1 so as to rotationally drive the brushless motor 1.

A paper feeding mechanism of a printer is coupled to a rotating shaft of the brushless motor 1 through the intermediary of, for example, a gear mechanism, although it is not shown. By controlling the drive of the brushless motor 1, the torque of the brushless motor 1 is transmitted to a paper feeding roller shaft constituting the paper feeding mechanism through the intermediary of the gear mechanism thereby to control paper feed. Furthermore, the paper feeding roller shaft is provided with a position detector 15, such as, for example, a rotary encoder, for detecting the rotational angle of the roller shaft.

The position detector 15 is configured to output two types of pulses signals for A-phase and B-phase of different phases and to be able to detect the rotational direction from the phase relationship between these two types of signals. The position detector 15 has a resolution that enables a plurality of pulses to be generated during one commutation section of the brushless motor 1.

The commutation control circuit 12 is constructed by primarily including, for example, a microcomputer, a memory, such as a ROM, for storing a commutation pulse number sequence P or the like, which will be discussed hereinafter, and receives two types of pulse signals from the position detector 15. Arid the commutation control circuit 12 detects the rotational direction of the brushless motor 1 and an edge of a pulse signal (hereinafter referred to as "pulse edge") on the basis of the two types of pulse signals from the position detector 15, and counts the number of pulses on the basis of the pulse edge according to the rotational direction. The commutation control circuit 12 adds pulses when the brushless motor 1 runs in the forward direction and is driven in the direction in which paper is fed by the paper feeding mechanism, whereas it subtracts the pulses when the brushless motor 1 runs in the reverse direction, thereby determining the commutation timing of the brushless motor 1 on the basis of the count number of the pulses and the commutation pulse number sequence P stored in a predetermined memory region.

Furthermore, the commutation control circuit 12 has a variable referred to as a commutation mode for controlling the combinations of the transistors to be turned ON among the transistors, which is not shown, of the inverter 11 by digitalizing the combinations. The commutation control circuit 12 is adapted to output a commutation signal that corresponds to the commutation mode on a one-to-one basis to the inverter 11. The commutation signal is constructed by a signal string for individually controlling the turning ON/OFF of the transistors of the inverter 11, and changes the commutation mode to an appropriate value in synchronization with the aforesaid commutation timing so as to rotate the brushless motor 1 in the rotational direction specified by a command signal from a host apparatus, which is not shown. Outputting the commutation signal based on the commutation mode to the inverter 11 allows the excitation of the stator windings U-phase through W-phase of the brushless motor 1 to be properly carried out, thus implementing the revolution of the brushless motor 1. Furthermore, the commutation control circuit 12 measures the rotational speed or the rotational angle of the paper feeding roller shaft on the basis of the pulse signals from the position detector 15 in a realtime mode and superimpose a control signal, e.g., a PWM signal, onto the commutation signal thereby to control the rotational speed or the rotational angle of the paper feeding roller shaft, in a similar manner as publicly known drive control processing in a brushless motor.

The commutation pulse number sequence P is set as described below. Specifically, for example, an intermediate voltage of the counter-electromotive voltage of each phase of the inverter 11 is detected, the brushless motor 1 is driven according to a publicly known method or the like in which the position shifted 30 degrees from the intermediate voltage is used as the commutation timing. For example, the number of pulses from the position detector 15 in a plurality of commutation sections is counted, and a section pulse number M, which is the number of pulses from the position detector 15 in one commutation section, is calculated primarily by dividing the number of pulses by the number of commutation sections.

For instance, the section pulse number M is to be represented by a fraction (102/5=20.4) if the number of pulses in five commutation sections is, for example, "102". In this case, since the section pulse number M is "20.4", the true commutation timings will be the points at which the numbers of pulses from an initial state wherein the rotor of the brushless motor 1 is located at the position of the commutation timing are 20.4, 40.8, 61.2, 81.6 . . . , as shown by the true values of commutation positions of Table 1.

TABLE 1

| No. of commutation | 1st | 2nd | 3rd | 4th | 5th |
|---|---|---|---|---|---|
| Inter-commutation signal number | 20 | 21 | 20 | 21 | 20 |
| Total No. of signals | 20 | 41 | 61 | 82 | 102 |
| True Values of Commutation Positions | 20.4 | 40.8 | 61.2 | 81.6 | 102 |
| Error | −0.4 | +0.2 | −0.2 | +0.4 | ±0 |

However, since the cumulative values of pulse signals are integral values, the integral values that provide minimized errors between the cumulative values and the true commutation timings, i.e., the true values of commutation positions, are determined by rounding off the digits to the right of decimal points thereby to provide the total numbers of signals representing the commutation timings, and the differences among the total numbers of signals at the respective commutation timings are set as the inter-commutation signal numbers. More specifically, at the first commutation timing, the true value of the commutation position is the point at which the cumulative value of the pulse signals is "20.4", and an integral value closest thereto is "20", so that the total number of signals will be set as "20". At this time, the error between the true value of the commutation position and the total number of signals will be "−0.4". Similarly, at the second commutation timing, the true value of the commutation position is the point at which the cumulative value of the pulse signals is "40.8", so that the total number of signals will be set as "41", and the error will be "+0.2". The number of signals between the first and second commutations will be "21". The third and fourth commutation timings will be set in the similar manner. In the case of the fifth commutation timing, the true value of the commutation position is "102", which is an integral value, so that this will be set as the total number of signals, and the inter-commutation signal number will be "20". At the fifth commutation timing, the error between the total number of signals and the true value of the commutation position will be "±0".

Subsequently, at the sixth commutation timing, the true value of the commutation position will be "122.4"; therefore, the total number of signals will be "122", the inter-commutation signal number will be "20", and the error will be "−0.4", the inter-commutation signal number and the error being the same as those at the first commutation timing mentioned above. Thereafter, in the same manner as that at the second commutation timing and after, the numbers of the signals between commutations will repeatedly be "21, 20, 21, 20". Thus, a sequence of numbers "20, 21, 20, 21, 20" consisting of the signals between commutations from the first commutation timing to the fifth commutation timing at which the error between the true value of the commutation position and the total number of signals becomes zero is set as the commutation pulse number sequence P, and stored in a predetermined memory region. In other words, the commutation pulse number sequence P is set and stored in a predetermined memory region in advance when a system is shipped from a factory, the system being constituted by, for example, the driving apparatus 10, the brushless motor 1, and the position detector 15 provided on the paper feeding mechanism acting as the object to be driven by the brushless motor 1.

The operation of the first embodiment will now be described in conjunction with a flowchart illustrating an example of a processing procedure in the commutation control circuit 12.

Upon a startup, the commutation control circuit 12 begins the commutation control processing shown in FIG. 2. First, in step S101, processing for setting a commutation origin is implemented to set the commutation origin that provides the reference for detecting a commutation timing. To be more specific, as shown in FIG. 3, initialization is first performed in step S201, and initial excitation pull-in is performed in the same manner as that of publicly known processing thereby to rotate the rotor of the brushless motor 1.

And, if it is detected that the rotor has stopped at a pull-in position by checking, for example, whether no pulse edge has been detected for a predetermined time, then the program proceeds to step S202 wherein it determines the startup direction of the brushless motor 1 on the basis of a command signal, which indicates the rotational direction of the brushless motor 1 at its startup, from a host apparatus. If the instructed rotational direction is forward direction, then the program proceeds to step S203 wherein it sets a count number C to C=0, and also sets a variable n, which specifies $n_{max}$ pieces of the inter-commutation signal numbers Pn making up the commutation pulse number sequence P that has been set and stored in a predetermined memory region beforehand, to n=1. Conversely, if the rotational direction instructed by the host apparatus is reverse direction, then the program proceeds from step S202 to step S204 wherein it sets count number C to C=$Pn_{max}$, and sets variable n for specifying the inter-commutation signal number Pn to n=$n_{max}$. This terminates the processing for setting the commutation origin. The foregoing $Pn_{max}$ indicates the inter-commutation signal number at the end of commutation pulse number sequence P, i.e., the inter-commutation signal number when n is $n_{max}$.

When the processing for setting the commutation origin in step S101 of FIG. 2 is terminated, and a startup command pulse instructing the startup of the brushless motor 1 is received from a host apparatus, the program proceeds from step S102 to step S103 to execute the startup processing of FIG. 4.

In the startup processing, first, in step S301, the rotational direction instructed by the host apparatus is determined, and if it is the forward direction, then the program proceeds to step S302 to execute the startup processing for the forward rotation by performing a changeover or the like of the commutation mode once to start in the forward direction. On the other hand, if the instructed rotational direction is the reverse direction, then the program proceeds from step S301 to step S303 to execute the startup processing for the reverse rotation by performing a changeover or the like of the commutation mode once to start in the reverse direction. This terminates the startup processing.

The exciting phase associated with the switched commutation mode is excited through the intermediary of the inverter 11. At this time, when the brushless motor 1 is run by controlling a commutation signal by the rotational speed control or the like mentioned above, the torque is transmitted to the paper feeding mechanism through the intermediary of the gear mechanism, which is not shown, thereby driving the paper feeding mechanism to feed paper.

When a pulse signal is output from the position detector 15 as the paper feeding mechanism is driven, the commutation control circuit 12 carries out the detection of a pulse edge of a pulse signal, and if the pulse edge is detected in step S104 of FIG. 2, then the program proceeds to step S105 to execute the commutation count processing, and proceeds to step S106. On the other hand, if the pulse edge is not detected in step S104, then the program proceeds directly to step S106.

The commutation count processing in the aforesaid step S105 is implemented according to the processing procedure shown in FIG. 5.

First, in step S211, it is determined whether the brushless motor 1 is running in the forward direction or the reverse direction from the two types of pulse signals from the position detector 15. If it is determined, for example, that the brushless motor 1 is running in the forward direction, then the program proceeds to step S212 wherein it increments the count number C by "1", then proceeds to step S213 wherein it refers to the commutation pulse number sequence P, which has been stored in a predetermined memory region beforehand, to determine whether its n-th inter-commutation signal number Pn coincides with the count number C.

For example, if n=1, then an inter-commutation signal number P1 is "20" according to Table 1; therefore, the program terminates the commutation count processing, and returns to FIG. 2. Thereafter, when the brushless motor 1 is running in the forward direction, the program proceeds from step S211 to step S213 via S212 and increments the count number C by "1" each time a pulse edge is detected. And when the count number C reaches an inter-commutation signal number P1=20, the program proceeds from step S213 to S214 wherein it switches the commutation mode to the forward direction. This switches the exciting phase, and the brushless motor 1 continues to run.

Subsequently, the program proceeds to step S215, and if the variable n is equal to $n_{max}$ representing the number of the inter-commutation signals constituting the commutation pulse number sequence P, then the program proceeds to step S216 wherein it resets the variable n to n=1, and proceeds to step S218. If the variable n is not n=$n_{max}$, then the program proceeds to step S217 wherein it increments the variable n by "1", and proceeds to step S218. And, after resetting the count number C to C=0 in step S218, the program terminates the commutation count processing, and returns to FIG. 2.

Thus, while the brushless motor 1 is running in the forward direction, the count number C is incremented by "1" each time an edge of a pulse signal is detected, and the commutation mode is switched each time the count number C coincides with the inter-commutation signal number Pn, namely, P1 (=20), P2 (=21), P3 (P=20), P4 (=21), and P5 (=20). And, the program returns to P1 again after the inter-commutation signal number P5 at the end of the commutation pulse number sequence P, and by repeatedly carrying this out, the value of Pn is changed in order from the beginning of the arrangement order of the inter-commutation signal numbers Pn. At the point when the count number C reaches the inter-commutation signal numbers Pn, the commutation mode is switched.

From this state, if a startup command pulse for running the brushless motor 1 in the reverse direction is received from a host apparatus after the brushless motor 1, which is running in the forward direction, is stopped to perform, for example, the adjustment or the like of the paper feeding mechanism, then the processing in steps S102, S104, and S106 is repeatedly implemented because no pulse edge is detected while the brushless motor 1 is at rest, and a state is maintained in which the program implements no commutation count processing and waits for a command signal from the host apparatus. When a startup command pulse is received from the host apparatus, the program proceeds from step S102 to step S103 and carries out the startup processing shown in FIG. 4. In this case, the instructed rotational direction is the reverse direction, so that the program proceeds from step S301 to step S303 to switch the commutation mode once so as to rotate the brushless motor 1 in the reverse direction.

This causes the brushless motor 1 to rotate in the reverse direction. If a pulse edge is detected, then the program proceeds from step S104 to step S105 to implement the commutation count processing of FIG. 5. Since the brushless motor 1 is running in the reverse direction, the program proceeds from step S211 to step S221 to decrement the count number C by "1".

Subsequently, the program proceeds to step S222 to determine whether the count number C is C=0, and if it is not C=0, then the program terminates the commutation count processing, and returns to FIG. 2. If the program determines that it is C=0, then the program proceeds to step S223 and decides that it is a commutation timing and switches the commutation mode to the reverse direction. After that, the program proceeds to step S224, and if the variable n is n=0, then the program proceeds to step S225 to set n=$n_{max}$, before it proceeds to step S227. If the variable is not n=0, then the program proceeds to step S226 to decrement n by "1" before it proceeds to step S227. And the program sets the count number C to C=Pn in step S227, then terminates the commutation count processing, and returns to FIG. 2.

Thus, while the brushless motor 1 is running in the reverse direction, each time a pulse edge is detected, the count number C is decremented by "1", and the commutation mode is switched when the count number C reaches C=0, and the variable n is decremented by "1" to set the count number C to C=Pn. In other words, conversely from the forward rotation, the value of Pn is switched from the end of the arrangement order of the inter-commutation signal numbers Pn.

And, if ending the drive of the brushless motor 1, that is, stopping the commutation control processing of FIG. 2, is notified from the host apparatus, then this is detected in step S106, and the processing is terminated.

The number of pulses in one commutation section, i.e., the section pulse number M, is "20.4"; therefore, if an arrangement is made so that, for example, the point at which the count number C reaches "20" provides the commutation timing, then the true commutation timing will be the position where the count number C is "20.4". The commutation timing is advanced by "0.4" per commutation, so that this will be added for each repetition of the commutation, leading to an increase in the error with respect to the true commutation timing position. The commutation timing will be gradually advanced, resulting in a malfunction. Conversely, if the point at which the count number C reaches "21" is provided as the commutation timing, then the commutation timing will be delayed by "0.6" per commutation, and this will be added and the error increases every time commutation is performed, and the commutation timing will be gradually delayed, resulting in a malfunction.

However, as shown in Table 1 above, a period of time until a cumulative value of the section pulse number M that is added up for each commutation timing reaches an integral value is defined as one cycle, and the inter-commutation signal number is set such that the error with respect to the cumulative value of the section pulse number M, which is the true commutation timing, at each commutation timing in this period of time is minimized. Therefore, the error between the true commutation timing position and the actual commutation timing at the point at the end of one cycle will be always zero. Furthermore, the inter-commutation signal number in one cycle is set such that the error of each commutation timing in one cycle from a true commutation timing position is minimized. Hence, errors will not be added for each commutation, and the error always remains at a level of the half count of a pulse or less, making it possible to control the error to a minimum.

At this time, the commutation control is conducted by utilizing the detection signals of the position detector 15, and the paper feeding speed control or paper feeding amount control, etc. is also conducted. This obviates the need for providing a position detector dedicated for commutation control, allowing the number of components of the driving apparatus 10 to be reduced.

The commutation timing is detected on the basis of the pulse signals from the position detector 15, so that the commutation control can be conducted as long as the pulse signals are output from the position detector 15. Thus, in a case where commutation control is carried out on the basis of a counter-electromotive voltage as in the prior art, the counter-electromotive voltage cannot be detected unless the rotational speed of the brushless motor 1 reaches a certain level or more, making it impossible to conduct the commutation control. According to the present invention, the commutation control is carried out on the basis of the pulse signals from the position detector 15, making it possible to conduct the commutation control even at low speed, independent of the rotational speed of the motor.

Furthermore, even if the brushless motor 1 is brought to a halt, the commutation timings are detected based on the pulse signals. Therefore, by storing the number of pulses, a phase to be energized can be immediately decided from the number of pulses when the brushless motor 1 is restarted after the halt. Moreover, since the commutation timings can be detected even at low speed, the commutation control can be performed at precise timings regardless of a halt or at the start of rotation.

In the foregoing first embodiment, the descriptions have been given of the case where the number of pulses of five commutation sections is "102" and the section pulse number M is "20.4"; however, the present invention is not limited thereto. For instance, when the number of pulses in one commutation section (the section pulse number M) is 511/25=20.44, if the inter-commutation signal numbers are set as shown in Table 1 above in the same manner, then the error between the true commutation timing and the total number of signals will become zero at the 25th commutation. Hence, the error becomes zero at every 25th commutation, and the commutation pulse number sequence P will be constituted by 25 inter-commutation signal numbers. In other words, if the section pulse number M can be represented by a fraction, then the error between the true commutation timing and the total number of signals will be brought to zero by carrying out the commutation for the same number of times as the value of the denominator of an irreducible fraction. Hence, the invention can be applied as long as the section pulse number M can be represented by a fraction.

Furthermore, in the above first embodiment, the commutation pulse number sequence P has been described in the case where the difference in the total number of signals is formed of the number of inter-commutation signals; however, the commutation pulse number sequence P may alternatively be constructed by, for example, the total number of signals. In this case, commutation is performed each time the count number C coincides with each total number of signals. When the count number C is increasing, the count number C is updated and set to zero when the count number C reaches the maximum value of the total number of signals. Conversely, when the count number is decreasing, the count number C is updated and set to the maximum value of the total number of signals when the count number C reaches zero.

The processing of step S105 in FIG. 2 corresponds to the counting means, the memory, which is not shown, of the commutation control circuit 12 corresponds to the commutation pattern storing means, and the commutation count processing of FIG. 5 corresponds to the commutation controlling means.

A second embodiment of the present invention will now be described.

In the above first embodiment, the descriptions have been given of the case where the section pulse number M is represented by fractions. In the second embodiment, a case where the section pulse number M takes integers will be described.

The entire construction of a driving apparatus 10 of a brushless motor 1 is the same as that of the first embodiment, and the commutation control processing will be the same except for the details of the processing for setting a commutation origin in step S101 and the commutation count processing in step S105. Accordingly, the illustrations and the same descriptions will be omitted, and the same places as those in the first embodiment will be assigned the same reference characters, and the same descriptions will be omitted.

In the second embodiment, the number of pulses in one commutation section, namely, the section pulse number M, that is calculated in the same manner as that in the first embodiment will be an integer. Hence, the section pulse number M is stored in a predetermined memory region, and when the number of pulses reaches the section pulse number M, this will be used as the commutation timing to carry out commutation.

More specifically, in the commutation control circuit 12, when the program is started, the commutation control processing shown in FIG. 2 is begun, and the processing for setting the commutation origin is implemented in step S101. In the second embodiment, however, the processing for setting the commutation origin shown in FIG. 6 is implemented. Specifically, first, initialization is performed in step S401, and the initial excitation pull-in is performed in the same manner as that of publicly known processing thereby to rotate the rotor of the brushless motor 1.

And, if the program detects that the rotor has stopped at a pull-in position by checking, for example, whether no pulse edge has been detected for a predetermined time, then the program proceeds to step S402 wherein it determines the rotational direction of the brushless motor 1 on the basis of a command signal indicating the rotational direction at the startup of the brushless motor 1 from a host apparatus. If the instructed rotational direction is forward direction, then the program proceeds to step S403 wherein it sets count number C to C=0. Conversely, if the instructed rotational direction is reverse direction, then the program proceeds from step S402 to step S404 wherein it reads the section pulse number M stored in a predetermined memory region in advance, and sets count number C to C=M. This terminates the processing for setting the commutation origin.

After the processing for setting the commutation origin in step S101 of FIG. 2 is thus terminated, if a startup command pulse instructing the startup of the brushless motor 1 is received from the host apparatus, then the program proceeds from step S102 to step S103 to implement the startup processing of FIG. 4, and performs the startup processing mainly by switching the commutation mode once according to the rotational direction instructed by the host apparatus in the same manner as that of the first embodiment.

And, when the brushless motor 1 runs and pulse signals are output from a position detector 15 as a paper feeding mechanism is driven, the program in the commutation control circuit 12 detects pulse edges of the pulse signals, and if the pulse edges are detected, then the program proceeds from step S104 to step S105 to implement the commutation count processing shown in FIG. 7.

More specifically, the program determines in step S411 whether the brushless motor 1 is running in the forward direction or the reverse direction from the two types of pulse signals from the position detector 15. If it is determined that the brushless motor 1 is running in, for example, the forward direction, then the program proceeds to step S412 to increment the count number C by "1", then proceeds to step S413 to determine whether the count number C coincides with the section pulse number M, and if it does not coincides, then the program terminates the commutation count processing and returns to FIG. 2. Thus, while the brushless motor 1 is running in the forward direction, the program repeatedly implements the processing of steps S411, S412, and S413, and increments the count number C by "1" each time a pulse edge is detected. And, if the count number C coincides with the section pulse number M in step S413, then the program proceeds to step S414, and decides that it is a commutation timing and switches the commutation mode to the forward direction. Thereafter, the program proceeds to step S415 to set the count number C to C=0, and terminates the commutation count processing.

From this state, if a startup command pulse for running the brushless motor 1 in the reverse direction is received from the host apparatus to run the brushless motor 1 in the reverse direction after the brushless motor 1 is stopped, then this is detected in step S102 of FIG. 2, and the program proceeds to step S103 to perform the startup processing for the reverse rotational direction in the startup processing shown in FIG. 4. And, when the brushless motor 1 runs in the reverse direction and the pulse edges of the pulse signals from the position detector 15 are detected in step S104, the program proceeds from step S104 to step S105 to implement the commutation count processing of FIG. 7. Since the brushless motor 1 is running in the reverse direction, the program proceeds from step S411 to step S421 to decrement the count number C by "1".

Subsequently, the program proceeds to step S422 to determine whether the count number C is C=0, and if it is not C=0, then the program terminates the commutation count processing, and returns to FIG. 2. If the count number C is C=0, then the program proceeds from step S422 to step S423 and decides that it is a commutation timing and switches the commutation mode to the reverse rotational direction. After setting the count number C to C=M in step S424, the program terminates the commutation count processing.

Thereafter, the program decrements the count number C by "1" each time it detects a pulse edge, and switches the commutation mode when the count number C reaches zero.

Thus, the commutation is performed each time the section pulse number M, which is the number of pulses in one commutation section that have been detected beforehand, coincides with the count number C, that is, each time the number of pulses that should be received in one commutation section are received. Hence, the commutation can be performed at precise timings. In this case also, there is no need to provide the position detector 15 dedicated for commutation control, making it possible to obtain the equivalent operations and advantages to those of the first embodiment.

In the first and second embodiments, the descriptions have been given of the cases where the brushless motor 1 is rotated in the forward and reverse directions. It is needless to say, however, that the present invention can be applied also to a case where, for example, the brushless motor 1 is driven only in the direction in which paper is fed.

A third embodiment of the present invention will now be described.

In the third embodiment, a brushless motor 1 drives, for example, a carriage 21 to which an ink head of an ink-jet printer is fixed. More specifically, as shown in, for example, FIG. 8, the carriage 21 is attached to a belt 23 extended between two pulleys 22a and 22b. The torque of the brushless motor 1 is transmitted to the pulley 22b to move the belt 23 to thereby move the carriage 21.

Commutation control is conducted on the basis of pulse signals from a position detector 15, such as a linear encoder or the like, that is provided on the carriage 21 to detect the position of the carriage.

The entire construction of a driving apparatus 10 of a brushless motor 1 is the same as that of the first embodiment; therefore, the illustrations and the same descriptions will be omitted, and the same places as those in the first embodiment will be assigned the same reference characters and the same descriptions will be omitted.

In the third embodiment, a reciprocal 1/M of a section pulse number M, which is the number of pulses in one commutation section, is set as a commutation constant T. Each time a pulse is received from the position detector 15, the commutation constant T is added or subtracted according to the rotational direction of the brushless motor 1, and a commutation timing is detected on the basis of a cumulative value S thereof.

In other words, adding the commutation constant T by the number of times of the section pulse number M produces one commutation section. Hence, the commutation constant T is added each time a pulse is received, and when the cumulative value S reaches "1" or more, that is, when one commutation section has elapsed, this is taken as the commutation timing. The commutation constant T is set as described below.

First, after performing, for example, initial excitation pull-in, the brushless motor 1 is rotated, and the number of pulses from the position detector 15 per rotation of the rotor of the brushless motor 1 is detected by performing, for example, measurement or the like of the number of pulses from the position detector 15 during one rotation of the brushless motor 1. The detected number of pulses is divided by the number of commutations required for one rotation of the rotor to calculate the pulse number M in one commutation section, and the reciprocal thereof 1/M is defined as the commutation constant T. At this time, the significant digit number to the right of the decimal number of the commutation constant T is set to satisfy expression (1) below:

$$n > \log[(5 \cdot L)/(B \cdot (1 - T - a \sin(X)/F))] - 1 \quad (1)$$

where n in the expression denotes the significant digit number to the right of the decimal point of the commutation constant T, L denotes the travel amount of the ink head provided on the carriage 21, B denotes the resolution [head travel amount/number of pulses] of the position detector 15, T denotes the commutation constant, X denotes the value of the root of a torque ripple when the peak torque of the brushless motor 1 is defined as "1", and is a value set based on the an electrical angle defining a permissible range, and F denotes the electrical angle of one commutation section.

The above expression (1) is derived as described below.

An error ε between the position of the rotor that is determined on the basis of commutation constant T from the pulse signal from the encoder acting as the position detector for detecting the position of the carriage 21 and the actual position of the rotor should lie within the range of a permissible range σ.

The commutation constant T is a value that represents the rotational amount of the brushless motor 1 for each count of the pulse signals from the encoder. More specifically, the value is, for example, obtained by measuring the number of pulses from the encoder during one rotation of the brushless motor 1, and by dividing the number of commutations required for one rotation of the brushless motor 1 by the measured number of pulses.

If the brushless motor 1 is a motor having a three-phase bipolar configuration, the electrical angle per count of pulse of the pulse signals is calculated by multiplying the commutation constant T by the electrical angle 60 deg·E per commutation.

Thus, it can be known that, when the commutation constant T is added from zero at a certain commutation timing taken as a starting point, the point at which the total of the added values reaches "1" or more provides the next commutation timing, namely, the position that is 60 deg·E ahead. In this case, the count of the number of pulses is digital count, so that it includes, in principle, an error within one signal count.

Meanwhile, when the carriage of the ink-jet printer is driven by the brushless motor 1, the torque of the brushless motor 1 is transmitted to the carriage 21 through the intermediary of the pulley 22b, as shown in FIG. 8. Hence, the diameter of the pulley decides the relationship between the motor rotational amount of the brushless motor 1 and the head feeding amount of the ink head mounted on the carriage. If the diameter of the pulley includes an error of about a manufacture tolerance, then the number of pulses from the encoder that are counted as the motor rotates varies by a few counts, depending on the variations in the diameter dimension of the pulley 22b. In case of multiple rotations, the error accumulates and may lead to a commutation malfunction.

To prevent this, the number of pulses from the encoder per rotation of the motor for driving the carriage may be counted to decide the commutation constant T on the basis of the count number in each printer that has been assembled.

When the brushless motor 1 is initially pulled in at the position of a certain commutation timing, the error of the number of pulses at this point is below one count of pulse signal at the maximum. Accordingly, a maximum value e1 of the error at the time of positioning of an initial commutation position of the brushless motor 1 will be smaller than the commutation constant T, that is, the rotational amount of the motor per count, as shown by expression (2) below:

$$e1 < T \quad (2)$$

The error obtained by counting the number of pulses as the carriage travels, and by calculating the rotational amount of the brushless motor 1 on the basis of the number of pulses will be below $5 \times 10^{-(n+1)}$ [1/count], i.e., $5 \times 10^{-(n+1)}$ [rotational amount of motor] at the maximum per count of pulse of the pulse signals if the significant digit number to the right of the decimal point. of the commutation constant T is handled as an n digit, i.e., if n+1(th) digit, which is the smallest digit, is rounded off to make it a number of an n digit. A maximum error e2 involved in the count of the pulses at the point when the pulses have been counted by Q times is represented by expression (3) below:

$$e2 < Q \times 5 \times 10^{-(n+1)} \text{ [rotational amount of motor]} \quad (3)$$

If the resolution of the encoder is denoted as B [travel amount of head/number of pulses], then a travel amount L of the head when the pulses are counted by Q times is represented by expression (4) below:

$$L = B \times Q \quad (4)$$

Therefore, the maximum value $\epsilon$ of the error of a recognized position of the rotor at this time is represented by expression (5) below according to expression (2) through expression (4) given above:

$$= e1 + e2 < T + Q \times 5 \times 10^{-(n+1)}$$

$$< T + (L/B) \times 5 \times 10^{-(n+1)} \quad (5)$$

Thus, for practical application, the error $\epsilon$ should stay within the permissible range $\sigma$.

In this case, the permissible range $\sigma$ is defined as the range of electrical angle wherein the value of the root of the torque ripple is X or more when the peak torque of the brushless motor 1 is taken as "1". In the case of EL three-phase motor, the value of the root of the torque ripple is $3^{1/2}/2$ in principle; therefore, the selectable range of the X will be $0 < X \leq (3^{1/2}/2)$.

An electrical angle F in one commutation section of the motor is 60 deg·E in the case of a three-phase motor; hence, the permissible range $\sigma$ is represented by expression (6) below:

$$\sigma = 60 - a \sin(X)[deg \cdot E] \quad (6)$$

Accordingly, the condition under which the error of the recognized position of the rotor of the brushless motor 1 when the head, i.e., the carriage, travels by L stays within the permissible range is represented by expression (7) below:

$$\epsilon \cdot 60 < \sigma \quad (7)$$

From the above expression (5) and expression (6), the above expression (7) will derive expression (8) below. Based on this, significant digit number n is calculated as shown by expression (9) below:

$$(T + (L/B) \times 5 \times 10^{-(n+1)}) \times 60 < 60 - a \sin(X) \quad (8)$$

$$n > \log[(5 \cdot L)/(B \cdot (1 - T - a \sin(X)/60))] - 1 \quad (9)$$

In this case, "60" in expression (9) is the electrical angle F in one commutation section, so that the foregoing expression (1) has been derived.

Therefore, for example, if the commutation constant T is set to 1/(184/36), the resolution B of the encoder is set to 25.4/180, the head travel amount L is set to 350 [mm], and the permissible value of the value X of the root of the torque ripple is set to $2^{1/2}/2$, then the significant digit number n will be n=5 according to the above expression (9), meaning that the significant digit number to the right of the decimal point of the commutation constant T should be 5.

At this time, for example, if inverse calculation is carried out by denoting the value X of the root of the torque ripple when the significant digit number n to the right of the decimal point of the commutation constant T is set to n=5 as $X_0$, expression (10) below is derived, and a worst value of the torque ripple under the set condition can be verified;

$$X_0 = \sin(60 \times (1 - T - (L/B) \times 5 \times 10^{-(n+1)})) = 0.737 > 2^{1/2}/2 \quad (10)$$

Furthermore, if, for example, the permissible range $\sigma$ is calculated as $\sigma_0$, expression (11) below will be derived, and it can be verified in a worst case that control is conducted while permitting the error of the electrical angle of $\sigma_0$.

$$\sigma_0 = 60 - a \sin(X_0) = 12.5 [deg \cdot E] \quad (11)$$

To control, for example, the error of the calculation of the rotor position involved in counting the number of pulses to a value below one count of pulse of the pulse signals, the significant digit number n may be set as set forth below.

The maximum error involved in counting signals at the point where pulses have been counted by Q times has to be below the commutation constant T; hence, expression (12) shown below should be derived from the above expression (3):

$$e2 < Q \times 5 \times 10^{-(n+1)} < T \quad (12)$$

Therefore, an integer n that satisfies the following expression (13) may be determined from the foregoing expression (4) and expression (12):

$$n > \log[5 \times L/(B \times T)] - 1 \quad (13)$$

Hence, if the commutation constant T is set to 1/(184/36), the resolution B of the encoder is set to 25.4/180, and the head travel amount L is set to 350 [mm], then the significant digit number n to the right of the decimal point of the commutation constant T will be n=4 according to the above expression (13), meaning that a significant digit number of 4 is required.

However, the worst value of the torque ripple at this time is $X_0 = 0.654$ from the foregoing expression (10), which is slightly too bad for a practical application. Furthermore, $\sigma_0 = 19.2$ [deg·E] from the foregoing expression (11), and it is understood that the control is carried out while permitting the deviation of 19.2 [deg·E] in commutation timing.

In this example, the condition under which the maximum error e2 is controlled below T is to be determined; hence, the maximum value $\epsilon$ of the error of the recognized position of the rotor is defined by the condition represented as $\epsilon = e1 + e2 < 2 \times T$.

For example, if the commutation constant T is set to 1/(184/36), the significant digit number thereof n is set to n=5, the resolution B of the encoder is set to 25.4/180, and the permissible value of the value X of the root of the torque ripple is set to $2^{1/2}/2$, then the head travel amount L can be determined by using the following expression (14) derived by modifying the foregoing expression (8):

$$L < (1 - T - a \sin(X)/60) \cdot B \cdot 10^{(n+1)}/5 \quad (14)$$

From this expression (14), it is understood that the head travel amount L of 0 to 1533 [mm] can be covered under the aforesaid condition. In other words, if the permissible value of the value X of the root of the torque ripple is set to $2^{1/2}/2$, then using five significant digits permits compatibility with printers for almost all paper sizes. Conversely, if four significant digits are used under the same condition as that shown above, then the head travel distance of 0 to 153 [mm] can be covered, meaning that paper of size A5 or smaller can be handled, while paper of size B5 or more cannot be handled.

In this case, when the resolution of the encoder is quadrupled, if the significant digit number is five, then the head travel amount L of 0 to 1418 [mm] can be handled, providing compatibility with printers handling almost all paper sizes. Furthermore, when only the pulley diameter is quadrupled, if the significant digit number is four, then 0 to 567 [mm] can be handled, and if the significant digit number is five, then up to 5675 [mm] can be handled.

Furthermore, when the resolution of the encoder is quadrupled and the pulley diameter is also quadrupled, if the significant digit number is five, then it is understood that the head travel amount L of 0 to 1677 [mm] can be handled, providing compatibility with almost all paper sizes.

As described above, it is understood that, if the permissible value of the value X of the root of the torque ripple is set to $2^{1/2}/2$, then the significant digit number n of the commutation constant T should be set to 4 or more.

The descriptions will now be given of a method for controlling the permissible value of the value X of the root of the torque ripple to a more accurate range.

As previously mentioned, in the case of a three-phase motor, the value of the root of a torque ripple is $3^{1/2}/2 \equiv 0.8660$ in principle. Therefore, it may be considered that control hardly causes deterioration in the torque ripple value as long as the control is conducted at a torque ripple of about 0.86, as a rough standard.

The condition that satisfies $X \geq 0.86$ is determined from expression (1) mentioned above. For example, with respect to the setting discussed heretofore, if the resolution of the encoder is increased to nine times, and the pulley diameter is doubled, then a value x=0.8602 is obtained. In this case, setting the significant digit number n of the commutation constant T to eight makes it possible to attain $X \geq 0.86$ within the range of the aforesaid head travel amount L of 0 to 1632 [mm], thus achieving the compatibility with printers of all paper sizes. Therefore, it is understood that it will be adequate if the significant digit number n of the commutation constant T is eight.

As described above, it has been found that setting the significant digit number n of the commutation constant T to a value of four digits or more and eight digits or less permits extremely effective control to be conducted.

A specific control flow will now be described. To detect the commutation timing on the basis of the commutation constant T that has been set as previously described, the detection is performed according to the processing procedure of the commutation control processing (commutation controlling means) shown in the flowchart of FIG. 2 mentioned above. The aforesaid commutation constant T is detected and stored in a predetermined memory region in advance.

First, the processing for setting a commutation origin is implemented in step S101. In the third embodiment, the processing for setting the commutation origin is carried out according to the procedure shown in FIG. 9.

More specifically, initialization is performed in step S501, and initial excitation pull-in is performed in the same manner as that of publicly known processing thereby to rotate the rotor of the brushless motor 1. Furthermore, the commutation constant T stored in the predetermined memory region is read.

And, if it is detected that the rotor has stopped at a pull-in position by checking, for example, whether no pulse edge has been detected for a predetermined time, then the program proceeds to step S502 wherein it determines the rotational direction of the brushless motor 1 on the basis of a command signal indicating the rotational direction at the startup of the brushless motor 1 from a host apparatus. If the instructed rotational direction is forward direction, then the program proceeds to step S503 wherein it sets a cumulative value S to S=0. Conversely, if the instructed rotational direction is reverse direction, then the program proceeds from step S502 to step S504 wherein it sets the cumulative value S to S=1. This terminates the processing for setting the commutation origin.

When the processing for setting the commutation origin in step S101 is terminated, and a startup command pulse instructing the startup of the brushless motor 1 is received from a host apparatus, the program proceeds from step S102 to step S103 to execute the startup processing of FIG. 4. In the same manner as that in the first embodiment, the commutation mode is switched once according to the rotational direction instructed by the host apparatus. This causes a commutation signal based on the commutation mode to be issued, and a predetermined phase is excited through the intermediary of the inverter 11, causing the brushless motor 1 to rotate in the forward or reverse direction according to a command signal. The torque of the brushless motor 1 is transmitted to the belt 23 through the intermediary of the pulley 22b, causing the carriage 21 to travel.

As the carriage 21 travels, a pulse signal is issued from the position detector 15, and when a pulse edge thereof is detected, the program proceeds from step S104 to step S105 to implement commutation count processing. In the third embodiment, the commutation count processing is implemented according to the procedure shown in FIG. 10. First, in step S511, the program determines whether the brushless motor 1 is running in the forward or reverse direction from the two types of pulse signals from the position detector 15. If it is determined that the brushless motor 1 is running in the forward direction, then the program proceeds to step S512 to add commutation constant T to the cumulative value S. Then, the program proceeds to step S513 to determine whether the cumulative value S is "1" or more, and if the cumulative value S is below "1", then the program terminates the commutation count processing and returns to FIG. 2. Each time a pulse edge of a pulse signal from the position detector 15 is detected, the program adds the commutation constant T to the cumulative value S in sequence. When the cumulative value S reaches "1" or more, the program proceeds from step S513 to step S514 to determine that it is a commutation timing, and switches the commutation mode to the forward direction. The program then subtracts "1" from the cumulative value S in step S515, and terminates the commutation count processing.

Thereafter, while the brushless motor 1 is running in the forward direction, the program repeatedly implements the processing of steps S511, S512, and S513. Each time a pulse edge of a pulse signal from the position detector 15 is detected, the program adds the commutation constant T to the cumulative value S, and each time the cumulative value S reaches "1" or more, the program switches the commutation mode, and subtracts "1" from the cumulative value S.

From this state, if a startup command pulse instructing the startup in the reverse rotational direction is received from a host apparatus after the brushless motor 1 is stopped in order to rotate the brushless motor 1 in the reverse direction, this is detected in step S102 of FIG. 2, and the program proceeds to step S103 to implement the startup processing for the reverse rotational direction. This causes the brushless motor 1 to run in the reverse direction, and when a pulse edge of a pulse signal is detected, the program proceeds from step S104 to S105 to carry out the commutation count processing of FIG. 10. Since the brushless motor 1 is running in the reverse direction, the program proceeds from step S511 to step S521 wherein it subtracts commutation constant T from the cumulative value S. Then, the program proceeds to step S522 to determine whether the cumulative value S is "0" or less, and if the cumulative value S is not $S \leqq 0$, then the program immediately terminates the commutation count processing. If it is found in step S522 that the cumulative value S is $S \leqq 0$, then the program proceeds to step S523 and decides that it is a commutation timing, and switches the commutation mode for the reverse rotational direction. Then, the program proceeds to step S524 to add "1" to the cumulative value S, and terminates the commutation count processing.

Thereafter, while the brushless motor 1 is running in the reverse direction, the program proceeds to steps S511, S521, and S522, and each time a pulse edge of a pulse signal from the position detector 15 is detected, the program subtracts the commutation constant T from the cumulative value S. each time the cumulative value S reaches "0" or less, the program decides that it is a commutation timing, and switches the commutation mode and adds "1" to the cumulative value S.

Thus, in the third embodiment described above, the commutation constant T is calculated from the rotational amount of the motor per one count of the pulses of the pulse signals, and the commutation constant T is added to or subtracted from the cumulative value S according to the rotational direction each time a pulse is received. If the cumulative value S reaches "1" or more while the commutation constant T is being added, or if the cumulative value S reaches "0" or less while the commutation constant T is being subtracted, then this is recognized as a commutation timing, and the commutation is performed. Moreover, the significant digit number n of the commutation constant T is set so that it stays within the permissible range of the error of commutation timing. Hence, the commutation can be performed at precise timings.

In particular, in the case of the motive power transmitting mechanism employing the gear mechanism shown in the above first or second embodiment, the speed ratio of the motor to the object to be driven is uniquely determined by a teeth number ratio. In contrast to this, in the case of the motive power transmitting mechanism employing the belt and pulleys shown in the above third embodiment, the speed ratio of the motor to the object to be driven depends on the diameters of the pulleys; therefore, the speed ratio varies with the variations in the degree of the manufacture tolerance of the diameters of the pulleys. For this reason, there is a danger in that, when the motor rotates numerous times, the cumulative value of the errors of the variations in the number of pulses of the encoder increases to a degree that triggers a commutation malfunction. The third embodiment, however, is ideally suited because it is capable of further reducing the commutation error.

Moreover, in this case also, the commutation control is carried out on the basis of the pulse signals of the position detector 15 for detecting the position of the carriage 21. Hence, there is no need to newly provide a position detector dedicated for the commutation control, permitting a reduction in the number of components.

To calculate the commutation constant T, the commutation constant T is set on the basis of the number of pulses from the position detector 15 when the brushless motor 1 is actually driven, and the number of commutations; however, it may alternatively be determined on a basis of, for example, calculation or the like. However, performing actual measurement makes it possible, for example, to reduce the influences on errors or the like by the tolerances or the like of a pulley for transmitting the driving force of the brushless motor 1 to a carriage, thus allowing commutation timings to be detected with higher accuracy.

Furthermore, the relationship between the significant digit number n of the commutation constant T and the permissible range $\sigma$ of commutation timing, and the relationship between the head travel amount L and the resolution B of the position detector 15, etc. are indicated as shown by the foregoing expression (1). Hence, by setting the commutation constant T such that the above expression (1) is satisfied according to the head travel amount or the resolution of the position detector 15, etc. of the printer to which the invention is applied, the commutation control can be easily carried out to obtain a desired permissible range $\sigma$, and the commutation control can be easily conducted to meet a required accuracy level even if a variable, such as the head travel amount or the resolution of the position detector 15, changes.

In addition, while the commutation constant T is being added to the cumulative value S, "1" is subtracted from the cumulative value S each time the cumulative value S reaches "1" or more. Conversely, while the commutation constant T is being subtracted from the cumulative value S, "1" is added to the cumulative value S each time the cumulative value S reaches "0" or less. This makes it possible to avoid an increase in the number of digits of the cumulative value S, so that memories for operation can be saved.

Since the commutation constant T takes a value of "1" or less, it is alternatively possible to multiply the commutation constant T by an n-th power of the significant digit number of 10 ($10^n$) to handle the commutation constant T as an integral value, and to perform commutation each time the n+1(th) digit on the high order side of the cumulative value S changes, or each time the cumulative value S reaches "0" or less. In this case also, $10^n$ may be subtracted from the cumulative value S each time the n+1(th) digit on the high order side of the cumulative value S changes while the commutation constant T is being added to the cumulative value S, whereas $10^n$ may be added to the cumulative value S each time the cumulative value S reaches "0" or less while the commutation constant T is being subtracted from the cumulative value S. This permits arithmetic operation of integral values, and arithmetic processing can be simplified.

A fourth embodiment of the present invention will now be described.

In the fourth embodiment, a cumulative value $S_R$ applied when the carriage 21 travels in the right direction, and a cumulative value $S_L$ applied when it travels to the left direction are provided in the aforesaid third embodiment. The commutation control is conducted on the basis of the cumulative value $S_R$ for the right direction when the carriage 21 is moved to the right. direction, while the commutation control is conducted on the basis of the cumulative value $S_L$ for the left direction when the carriage 21 is moved to the left direction.

The fourth embodiment is identical to the third embodiment except for the processing procedure of the commutation control processing in the commutation control circuit 12; hence, the same portions will be assigned the same reference characters, and the detailed descriptions thereof will be omitted.

In the fourth embodiment, when the program is started, it implements the foregoing commutation control processing of FIG. 2; however, for the processing for setting the commutation origin in step S101, the processing for setting the commutation origin shown in FIG. 11 is carried out. In this case, when the carriage 21 is located, for example, in the vicinity of the middle between the foregoing pulleys 22a and 22b, this is defined as the position for setting commutation origins, and the commutation origins, i.e., the initial values of the cumulative values $S_R$ and $S_L$, are set at the position for setting commutation origins. To be more specific, first, in step S601, a tentative commutation origin used for moving the carriage 21 to the position for setting commutation origins is set. In step S601, as the processing for setting a tentative commutation origin, the processing for setting a commutation origin shown in FIG. 9 is performed in the same manner as that in the above third embodiment. Next, the program proceeds to step S602 wherein it starts the brushless motor 1 in the direction for the position for setting the commutation origin. When the brushless motor 1 starts running, causing the carriage 21 to travel, and a pulse edge output from a position detector 15 is detected, (step S603), the program proceeds to step S604 wherein it carries out the commutation count processing shown in FIG. 10. In step S605, the program determines whether the carriage 21 reaches the position for setting commutation origins, and if not, the program returns to step S603 and repeatedly implements steps S603 through S605 until the position for setting commutation origins is reached.

The method for moving the carriage 21 to the position for setting commutation origins is not limited to the method in which the commutation control processing is implemented to move the carriage 21 to the position for setting commutation origins in the third embodiment. Alternatively, for example, a commutation timing and a rotational direction may be instructed by a host apparatus to forcibly switch the commutation mode thereby to move the carriage 21 to the foregoing position for setting commutation origins.

When the carriage 21 is moved as described above, and when the carriage 21 reaches the position for setting commutation origins, the program proceeds from step S605 to step S606. Whether the carriage 21 has reached the position for setting commutation origins is determined by, for example, counting pulse edges according to the rotational direction each time a pulse edge is detected, and estimating the current position of the carriage 21 on the basis of the count number.

In step S606, the commutation mode at that time is stored in a predetermined memory region so as to inhibit the switching of the commutation mode that is performed in FIG. 12 (hereinafter referred to as "automatic switching of commutation mode), which will be discussed later.

Subsequently, the program proceeds to step S607, and if it detects that a rotor has stopped at a balanced position where the torque is balanced, namely, a pull-in position, by, for example, checking that no pulse edges of pulse signals from the position detector 15 have been detected for a predetermined time, then the program proceeds to step S608, and the program forcibly switches the commutation mode once to the forward direction (in the direction for moving the carriage 21 in the right direction in this case) according to the commutation mode that has been stored in the predetermined memory region in the aforesaid step S606.

Subsequently, the program proceeds to step S609, and if the program detects that the rotor has stopped at the pull-in position, then it proceeds to step S610 to set the cumulative value $S_R$ to $S_R=1$, taking the pull-in stop position as the commutation origin when the carriage 21 travels in the right direction. Furthermore, the program sets $S_L=1$ as the initial value of the cumulative value $S_L$.

Then, the program proceeds to step S611, and forcibly switches the commutation mode once in the reverse direction this time (in the direction for moving the carriage 21 in the left direction in this case), and proceeds to step S613 to implement the commutation count processing shown in FIG. 12. The details of the commutation count processing shown in FIG. 12 will be discussed hereinafter. After that, the program proceeds to step S614 wherein it determines whether the rotor has stopped at the pull-in position, and if the rotor has not stopped at the pull-in position, then the program proceeds to step S612 wherein it determines whether a pulse edge has been detected. If a pulse edge has been detected, then the program proceeds to step S613 to carry out the commutation count processing, whereas if no pulse edge has been detected, then the program proceeds to step S614.

If it is detected in step S614 that the rotor has stopped at the pull-in position, then the program proceeds from the step S614 to step S615 wherein it determines whether the rotational direction at the startup of the brushless motor 1 notified from a host apparatus is the forward direction. If it is determined that the startup direction is the forward direction, then the program proceeds from step S615 to step S616, and sets a cumulative value $S_L$ to $S_L=0$, using the pull-in stop position as the commutation origin when the carriage 21 travels in the left direction. On the other hand, if the rotational direction is the reverse direction, the program proceeds from step S615 to S617, and sets a cumulative value $S_L$ to $S_L=1$, using the pull-in position as the commutation origin when the carriage 21 travels in the left direction. Then, the program proceeds to step S618 wherein it authorizes the automatic switching of the commutation mode, and terminates the processing for setting commutation origins.

When the processing for setting commutation origins is ended as described above, the program proceeds from step S101 to step S102 of FIG. 2, and if a startup command pulse is received from the host apparatus, the program executes the startup processing according to the rotational direction. This causes a pulse signal to be output, and when a pulse edge thereof is detected, the program proceeds from step S104 to step S105 wherein it implements the commutation count processing shown in FIG. 12 that has been implemented in the foregoing step S611.

In the commutation count processing, first, in step S621, the program determines whether the brushless motor 1 is running in the forward direction from the two types of pulse signals from the position detector 15. If it is determined that the brushless motor 1 is running in the forward direction, then the program proceeds to step S622 to add the commutation constant T to the cumulative values $S_R$ and $S_L$, respectively, and proceeds to step S623 thereafter.

In the step S623, the program determines whether the cumulative value $S_L$ is "1" or more, and if it is "1" or more, then the program proceeds to step S624 wherein it subtracts "1" from $S_L$, and proceeds to step S625, whereas, if it is not "1" or more, then the program immediately proceeds to step S625. In step S625, the program determines whether the cumulative value $S_R$ is "1" or more, and if $S_R>1$, then the program proceeds to step S626 to determine that it is a commutation timing, and switches the commutation mode to the forward direction. The program then proceeds to step S627 wherein it subtracts "1" from the cumulative value $S_R$, then terminates the commutation count processing and returns to FIG. 2. On the other hand, if the program determines that the cumulative value $S_R$ is not "1" or more in step S625, then the program immediately terminates the commutation count processing and returns to FIG. 2.

On the other hand, if the rotational direction is the reverse direction, then the program proceeds from step S621 to S631 wherein it subtracts the commutation constant T from the cumulative values $S_R$ and $S_L$, then proceeds to step S632 wherein it determines whether the cumulative values $S_R$ is "0" or less. If the cumulative values $S_R$ is "0" or less, then the program proceeds to step S633 wherein it adds "1" to the cumulative values $S_R$, then proceeds to step S634. If the cumulative values $S_R$ is not "0" or less, then the program immediately proceeds to step S634.

In the step S634, the program determines whether the cumulative value $S_L$ is "0" or less, and if $S_L \leq 0$, then the program proceeds to step S635 to determine that it is a commutation timing, and switches the commutation mode to the reverse direction. The program then proceeds to step S636 wherein it adds "1" to the cumulative value $S_L$, then terminates the commutation count processing and returns to FIG. 2. On the other hand, if the program determines that the cumulative value $S_L$ is not "0" or less in step S634, then the program immediately terminates the commutation count processing and returns to FIG. 2.

When the commutation count processing shown in FIG. 12 is performed by the processing of step S613 of the processing for setting commutation origins of FIG. 11, the switching of commutation mode will not be carried out in step S626 or step S635 even if the cumulative value $S_R$ becomes $S_R \geq 1$ in step S625, or if the cumulative value $S_L$ becomes $S_L \leq 0$ in step S634 because the automatic switching of the commutation mode has been inhibited by the processing of step S606 of FIG. 11. More specifically, in the processing for setting commutation origins in step S101 shown in FIG. 11, the commutation count processing of FIG. 12 is implemented to only update the cumulative values $S_R$ and $S_L$.

As described above, in the fourth embodiment, the commutation origins are set by the processing for setting commutation origins of step S101. From the point when the commutation origins for the right direction and the left direction are set, the cumulative values $S_R$ and $S_L$ are updated. When a startup command pulse is received from the host apparatus, the processing for the startup in the specified rotational direction is implemented to start the brushless motor 1 (step S103), and if a pulse edge of a pulse signal from the position detector 15 is detected, the cumulative values $S_R$ and $S_L$ are updated according to the detection, and the commutation mode is switched on the basis of the cumulative values $S_R$ and $S_L$.

More specifically, when the brushless motor 1 is running in the forward direction, the commutation constant T is added to the cumulative value $S_R$ of the right direction each time a pulse edge is detected, and based thereon, a commutation timing is generated. The commutation constant T is also added to the cumulative value $S_L$ for the left direction each time a pulse edge is detected. Conversely, when the brushless motor 1 is running in the reverse direction, the commutation constant T is subtracted from the cumulative value $S_L$ of the left direction each time a pulse edge is detected, and based thereon, a commutation timing is detected. The commutation constant T is also subtracted from the cumulative value $S_R$ for the right direction each time a pulse edge is detected.

During the forward rotation, the commutation mode is switched each time the cumulative value $S_R$ reaches "1" or more on the basis of the cumulative value $S_R$ when the commutation origin for the right direction is used as the reference. During the reverse rotation, the commutation mode is switched each time the cumulative value $S_L$ when the commutation origin for the left direction is used as the reference reaches "0" or less.

As shown in, for example, FIG. 8, if the rotational motion of the brushless motor 1 is converted into a linear motion of the belt 23 by the pulleys 22a and 22b, and the carriage 21 is driven by the belt 23, then the path for the torque of the brushless motor 1 to be transmitted to the carriage 21, i.e., the length of the belt, is different depending on whether the motor is running in the forward direction or the reverse direction. Accordingly, switching the rotational direction causes a mismatch between the position of the rotor and the absolute position of the carriage 21, depending on the stretching amount of the belt 23.

However, in the fourth embodiment, the position of the commutation origin is provided separately for the forward rotation and the reverse rotation, and the commutation timings are detected on the basis of the cumulative value $S_R$ for the right direction during the forward rotation, and on the basis of the cumulative value $S_L$ for the left direction during the reverse rotation. Therefore, at the point when the commutation origins are set, the error based on the stretching amount of the belt is eliminated, so that it is possible to avoid the occurrence of a difference in commutation timing attributable to the difference in the rotational direction of the brushless motor 1, thus permitting commutation to be perform at precise timings.

Hence, even if the movement of the carriage becomes unsmooth or the entire belt elongates due to, for example, deterioration with age, the commutation can be performed at precise timings.

In this case also, each time the high order position of the cumulative value $S_L$ or $S_R$ is carried, "1" is subtracted from the cumulative value $S_L$ or $S_R$. Hence, it is possible to avoid an increase in the number of digits of the cumulative value $S_L$ or $S_R$, allowing the memories for arithmetic operations to be saved.

Moreover, the initial value of the cumulative value $S_L$ is set to a different value according to the rotational direction after completion of the setting of commutation origins. This inhibits an inconvenience in that the values of the cumulative values $S_L$ and $S_R$ are always the values larger than "1" or the values below "0", so that commutation will not be performed forever, depending on driving situations.

In the fourth embodiment also, the commutation constant T may be multiplied by the n-th power of the significant digit number of 10 ($10^n$) to handle it as an integral value. At this time, $10^n$ may be subtracted from the cumulative value $S_L$ or $S_R$ each time the high order position is carried.

In the fourth embodiment described above, the commutation origins are set in the vicinity of the middle of the belt. The commutation origins are, however, not limited thereto; arbitrary positions, e.g., both ends of the belt, may be set as the commutation origins. However, regarding the stretching amount of the belt, the area in the vicinity of the middle of the belt provides an average stretching amount. Hence, setting the commutation origins in the vicinity of the middle makes it possible to further precisely cut the influences of errors caused by the elongation of the belt.

In the above embodiments, the descriptions have been given of the cases where the commutation timings of the motor that drives the carriage or the paper feeding mechanism of a printer are detected on the basis of the pulse signals from the encoder or the like provided thereon. The present invention, however, is not limited thereto; the present invention can be applied to a construction in which, as a motor is driven, a pulse signal can be obtained from a position detector on the basis of a travel amount of an object to be driven by a motor.

The present invention can be also applied to a sensor for detecting the position of an object to be driven, such as a potentiometer. In this case, the operations and advantages equivalent to those described above can be obtained by providing a pulse generating circuit that outputs a pulse signal when an object to be driven travels for a predetermined amount on the basis of, for example, the positional information of the potentiometer, and by conducting the control in the same manner as described above on the basis of the pulse signal output by the pulse generating circuit.

In the above embodiments, the descriptions have been given of the case where the commutation control is carried out based on the detection signals from the position detector 15. Alternatively, however, based on the detection signals from the position detector 15, speed control or phase control may be carried out at the same time rather than carrying out only the commutation control.

In the above embodiments, the descriptions have been given of the cases where the DC brushless motor is applied; the motor, however, is not limited thereto, and a step motor or the like may be also applied. Furthermore, the descriptions have been made of the case where a linear encoder or a rotary encoder or the like is applied as the encoder; however, the encoder is not limited thereto. An optical or magnetic encoder may alternatively be applied.

In the above embodiments, the descriptions have been given of a case where the present invention is applied to the three-phase brushless motor; however, the present invention is not limited thereto. The present invention may also be applied to a singe-phase or two-phase, or a four- or more phase brushless motor.

In the third or the fourth embodiment, the descriptions have been given of the case where the drive control is carried out on the carriage 21 to which the torque of the brushless motor 1 is transmitted through the intermediary of the pulley 22b. The present invention, however, can be also applied to a case where a paper feeding mechanism to which the torque of the brushless motor 1 is transmitted through the intermediary of a gear mechanism or the like is driven, as in the first or second embodiment.

As described above, the commutation control of a motor is carried out on the basis of the pulse signals from a position detector that are output as an object to be driven travels. Hence, even if the motor is in a low rotation zone, commutation timings can be accurately detected, permitting commutation control to be carried out with high accuracy.

The number of pulses of the pulse signals from the position detector is courted according to the rotational direction of the motor, and the commutation of the motor is performed when the count value coincides with an integral value identified by a commutation pattern set on the basis of the number of pulses received in one commutation section detected in advance. Therefore, commutation can be performed at precise commutation timings.

The commutation pattern is constructed by the commutation timing values based on the number of additions performed until the sum of the number of section pulses, which indicates the number of pulses per commutation section, reaches an integral value when the numbers of section pulses are added in sequence. Furthermore, a commutation timing value is set on the basis of the value which is an integral value obtained by rounding off the digits to the right of the decimal point of the sum of the aforesaid number of section pulses in each addition. Hence, the shift in the commutation timing will not be accumulated each time commutation is performed, so that commutation control can be conducted with high accuracy with controlled shift in commutation timing.

Each time a pulse is received from the position detector that is output as an object to be driven travels, the commutation constant, which is a reciprocal number of the number of pulses per commutation section of the motor, is added or subtracted according to the rotational direction of the motor, and commutation is performed when the integral portion of a cumulative value of the commutation constant changes or the cumulative value becomes an integral value, or the sign of the cumulative value changes. Hence, commutation can be performed at precise timings, enabling commutation control to be carried out with high accuracy.

The commutation constant can be easily calculated by dividing the number of commutations required for rotating a rotor by a predetermined amount by a design value of the number of pulses to be received when performing the rotation. Furthermore, a commutation constant for a torque transmitting system of an actual motor can be set by measuring the number of pulses actually received when the rotor is rotated by the predetermined amount and by calculating the commutation constant on the basis thereof.

The number of pulses received when the rotor is rotated once is measured, and the commutation constant is calculated on the basis thereof. This makes it possible to obtain a commutation constant in which all the variations in the commutation timings attributable to the dimensional errors of the components in the motor are averaged, allowing the prevention of commutation timing errors from accumulating.

The significant digit number n to the right of the decimal point of the commutation constant T is set such that, if the travel of the object to be driven is denoted as L, the resolution of a position detector (the travel of the object to be driven/the number of pulses) is denoted as B, a permissible value of the difference between an estimated position of the rotor estimated on the basis of the pulse signal and the actual position of the rotor is denoted in terms of an electrical angle $\sigma$, and the electrical angle of one commutation is denoted as F, then $(T+(L/B)\times(5/10^{n+1}))\times F < \sigma$ is satisfied. Hence, even if the variables, such as the travel amount of the object to be driven or the resolution of the position detector changes, commutation control that allows the permissible value $\sigma$ to be satisfied can be easily conducted.

If the object to be driven is an ink discharging head of an ink-jet printer, then setting the significant digit number n to the right of the decimal point of a commutation constant to 4 to 8 enables applicability to printers for nearly all paper sizes.

The commutation controlling means subtracts "1" from a cumulative value each time the cumulative value reaches "1" or more while the commutation constant is being added. Conversely, while the commutation constant is being subtracted, "1" is added to the cumulative value each time the cumulative value reaches "0" or less. Hence, it is possible to avoid an increase in the digit number of the cumulative value of the commutation constant.

The commutation controlling means multiplies the commutation constant by $10^m$ to handle it as an integral value when the digit number to the right of the decimal point of the commutation constant is m, so that the arithmetic operation includes only integral values, permitting the arithmetic operation to be simplified. At this time also, while a commutation constant is being added, $10^m$ is subtracted from a cumulative value each time an m+1(th) digit on the high order side of the cumulative value changes, whereas, while the commutation constant is being subtracted, $10^m$ is added to the cumulative value each time the cumulative value reaches "0" or less. This makes it possible to avoid an increase in the digit number of the cumulative value of commutation constants.

What is claimed is:

1. A motor driving apparatus comprising a position detector that detects a position of an object by the movement of the object driven by a motor and outputs a pulse signal representing the position, and commutation controlling means for controlling the commutation of said motor on the basis of the pulse signal from said position detector.

2. A motor driving apparatus comprising:
   a position detector that detects a position of an object by the movement of the object driven by a motor and outputs a pulse signal representing the position, and outputs at least one pulse per commutation section of said motor;
   counting means for adding or subtracting pulses from said position detector according to a rotational direction of said motor, taking a state wherein a rotor of said motor is in an initial position as a reference;
   commutation pattern storing means for storing a commutation pattern that specifies a commutation timing set on the basis of the number of the pulses per commutation section of said motor; and
   commutation controlling means for performing the commutation of said motor if a count value of said counting means coincides with a commutation pattern stored by said commutation pattern storing means.

3. A motor driving apparatus according to claim 2, wherein
   said commutation pattern is constructed by a string of commutation timing values set on the basis of a string of numeric values created by adding the numbers of section pulses, which are said numbers of pulses per commutation section, until a sum of said numbers of section pulses become an integral value, rounding off all digits to the right of a decimal point of the sum of said numbers of section pulses in each adding cycle so as to obtain integral values, and arranging the integral values in an ascending order; and
   said commutation controlling means repeatedly switches said commutation timing values in the order in which the commutation timing values are arranged in said commutation pattern, and performs commutation each time said commutation timing value coincides with said count value.

4. A motor driving apparatus comprising:
   a position detector that outputs a pulse signal as an object driven by a motor travels, and is able to output at least one or more pulses per commutation section of said motor;
   commutation constant storing means for storing, as a commutation constant, a reciprocal of the number of section pulses, which is the number of pulses from said position detector per commutation section of said motor, that has been detected in advance; and
   commutation controlling means that adds or subtracts a commutation constant stored by said commutation constant storing means according to a rotational direction of said motor each time a pulse is received from said position detector, taking a state wherein a rotor of said motor is in an initial position as a reference, and performs commutation of said motor if a cumulative value of the commutation constants becomes an integral value or if an integral portion of said cumulative value changes, or if a sign of said cumulative value changes.

5. A motor driving apparatus according to claim 4, wherein said commutation constant is a value obtained by dividing the number of commutations required for rotating said rotor by a predetermined amount by a design value of the number of pulses to be received for rotating said rotor by said predetermined amount.

6. A motor driving apparatus according to claim 4, wherein said commutation constant is a value obtained by dividing the number of commutations required for rotating said rotor by a predetermined amount by a measured value of the number of pulses that have been received when said rotor has been rotated by said predetermined amount.

7. A motor driving apparatus according to claim 6, wherein said commutation constant is a value obtained by dividing the number of commutations required for rotating said rotor once by a measured value of the number of pulses that have been received when said rotor has been rotated once.

8. A motor driving apparatus according to claim 4, wherein, if said commutation constant is denoted as T, a significant digit number to the right of the decimal point thereof is denoted as n, the travel of said object to be driven is denoted as L, the resolution of said position detector (the travel amount of the object to be driven/the number of pulses) is denoted as B, a permissible value of the difference between an estimated position of said rotor estimated on the basis of said pulse signal and the actual position of the rotor is denoted in terms of an electrical angle σ, and the electrical angle in one commutation is denoted as F, then the following relationship holds:

$$(T+(L/B)\times(5/10^{n+1}))\times F < \sigma$$

9. A motor driving apparatus according to claim 4, wherein said object to be driven is an ink discharging head of an ink-jet printer, and the significant digit number to the right of the decimal point of said commutation constant is 4 to 8 digits.

10. A motor driving apparatus according to claim 4, wherein said commutation controlling means subtracts 1 from said cumulative value each time the cumulative value of said commutation constant reaches 1 or more while said commutation constant is being added, whereas it adds 1 to said cumulative value each time said cumulative value reaches 0 or less while said commutation constant is being subtracted.

11. A motor driving apparatus according to claim 4, wherein, if the digit number to the right of the decimal point of said commutation constant is denoted as m, then said commutation controlling means multiplies said commutation constant by $10^m$ to handle it as an integral value of a digit number m, and performs commutation if an (m+1)th digit on the high order side of a cumulative value of said commutation constant changes or said cumulative value reaches zero, or the sign of said cumulative value changes.

12. A motor driving apparatus according to claim 11, wherein said commutation controlling means subtracts $10^m$ from said cumulative value each time the (m+1)th digit on the high order side of the cumulative value of said commutation constant changes, and adds $10^m$ to said cumulative value each time said cumulative value reaches 0 or less.

13. A motor driving apparatus comprising:
   a brushless motor;
   an inverter;
   a commutation control circuit; and
   a position detector;
   wherein said position detector detects a position of an object by the movement of the object driven by a motor and outputs a pulse signal representing the position, and outputs a plurality of pulses from each of an A-phase and a B-phase to said commutation control circuit; and
   said commutation control circuit adds the pulses when said brushless motor runs in a forward direction and subtracts the pulses when said brushless motor runs in a reverse direction to determine a commutation timing.

14. A motor driving apparatus according to claim 13, wherein a section pulse number which is the number of pulses divided by the number of commutation sections determines a commutation pulse number sequence.

15. A motor driving apparatus according to claim 14, wherein the section pulse number is a fraction.

16. A motor driving apparatus according to claim 14, wherein the section pulse number is an integer.

17. A motor driving apparatus comprising:
   a brushless motor;
   an inverter;
   a commutation control circuit;
   a position detector provided on a carriage to which an ink head of an ink-jet printer is fixed;
   wherein a reciprocal of a section pulse number, which is the number of pulses in one commutation section, is set as a commutation constant; and
   each time a pulse is received from said position detector said commutation constant is added or subtracted according to a rotational direction of said brushless motor determining a commutation timing.

18. A motor driving apparatus according to claim 8, wherein said object to be driven is an ink discharging head of an inkjet printer, and the significant digit number to the right of the decimal point of said commutation constant is 4 to 8 digits.

* * * * *

UNITED STATES PATENT AND TRADEMARK OFFICE
CERTIFICATE OF CORRECTION

PATENT NO.     : 6,624,602 B2
DATED          : September 23, 2003
INVENTOR(S)    : Akihiko Ikegami et al.

It is certified that error appears in the above-identified patent and that said Letters Patent is hereby corrected as shown below:

Title page,
Item [75], Inventors, delete "Akihiko Ikegami, Suwa (JP)" and insert
-- Akihiko Ikegami, Okaya (JP) -- therefor Column 7,
Line 5, "pulses" should be -- pulse --
Line 16, "Arid" should be -- and --

Column 14,
Line 31, "coincides" should be -- coincide --

Column 16,
Line 15, delete "an"

Column 17,
Line 41, "EL" should be -- a --

Column 21,
Line 28, "each" should be -- Each --

Column 23,
Line 56, "mode)" should be -- mode") --

Column 24,
Line 66, ">" should be -- < --
Lines 32-33, "perform" should be -- performed --

Signed and Sealed this

Twenty-fifth Day of May, 2004

JON W. DUDAS
*Acting Director of the United States Patent and Trademark Office*